(12) United States Patent
Taylor et al.

(10) Patent No.: US 11,100,195 B2
(45) Date of Patent: Aug. 24, 2021

(54) ZERO-KNOWLEDGE OFFERS IN UNIVERSAL DATA SCAFFOLD BASED DATA MANAGEMENT PLATFORM

(71) Applicant: Thinkspan, LLC, Mill Valley, CA (US)

(72) Inventors: Brian Samuel Taylor, Highland Park, IL (US); Matthew Maxwell Murphy, Chicago, IL (US); James Michael Faris, Chicago, IL (US)

(73) Assignee: THINKSPAN, LLC, Highland Park, IL (US)

( * ) Notice: Subject to any disclaimer, the term of this patent is extended or adjusted under 35 U.S.C. 154(b) by 174 days.

(21) Appl. No.: 15/996,283

(22) Filed: Jun. 1, 2018

(65) Prior Publication Data

US 2018/0349941 A1 Dec. 6, 2018

Related U.S. Application Data

(60) Provisional application No. 62/514,646, filed on Jun. 2, 2017.

(51) Int. Cl.
*G06Q 30/00* (2012.01)
*G06F 21/10* (2013.01)
(Continued)

(52) U.S. Cl.
CPC ............ *G06F 21/10* (2013.01); *G06F 3/0482* (2013.01); *G06F 21/6218* (2013.01);
(Continued)

(58) Field of Classification Search
CPC ...... G06F 9/5083; G06F 21/10; G06F 3/0482; G06F 21/6218; G06F 2221/2107;
(Continued)

(56) References Cited

U.S. PATENT DOCUMENTS

| 10,410,125 B1 | 9/2019 | Finkelstein et al. |
| 2003/0120665 A1 | 6/2003 | Fox et al. |

(Continued)

FOREIGN PATENT DOCUMENTS

| WO | 2013088282 A1 | 6/2013 |
| WO | 2018223072 A1 | 12/2018 |

(Continued)

OTHER PUBLICATIONS

Supplemental European Search Report dated Sep. 29, 2020 for European Application No. 18809065.8, 2 pages.

(Continued)

*Primary Examiner* — Sun M Li
(74) *Attorney, Agent, or Firm* — Perkins Coie LLP

(57) ABSTRACT

The disclosure is related to a data management platform ("platform") for providing a secure storage environment for digital contents associated with a user. The platform may be accessible via an app installed on a user device, which allows the user to upload, modify, and view digital contents. Because a digital content is mapped to a universal scaffold in a structured format, the platform can organize and display the digital contents in meaningful ways. The digital contents can be hosted on a remote server. The platform provides zero-knowledge encryption so that the digital contents stored at the server are secure, as in one cannot know the contents of the encrypted information stored at the server. The platform also facilitates zero-knowledge offers in which offers are sent to multiple users but the server does not know to which users the offers are presented until an offer is accepted by the user.

25 Claims, 25 Drawing Sheets

(51) Int. Cl.
  *G06F 21/62* (2013.01)
  *G06F 3/0482* (2013.01)
  *G06Q 30/02* (2012.01)
  *H04L 9/32* (2006.01)
  *H04L 29/06* (2006.01)

(52) U.S. Cl.
  CPC ....... *G06Q 30/0241* (2013.01); *H04L 9/3221* (2013.01); *G06F 2221/2107* (2013.01); *H04L 67/42* (2013.01)

(58) Field of Classification Search
  CPC .. G06Q 30/02; G06Q 30/0241; H04L 63/061; H04L 9/3221; H04L 67/42
  USPC ................... 705/14.39, 14.4, 14.73; 718/104
  See application file for complete search history.

(56) References Cited

U.S. PATENT DOCUMENTS

| | | |
|---|---|---|
| 2003/0163597 A1 | 8/2003 | Hellman et al. |
| 2005/0071251 A1 | 3/2005 | Linden et al. |
| 2005/0210047 A1 | 9/2005 | Hayes et al. |
| 2006/0195362 A1 | 8/2006 | Jacobi et al. |
| 2006/0248045 A1 | 11/2006 | Toledano et al. |
| 2006/0265396 A1 | 11/2006 | Raman et al. |
| 2007/0078877 A1 | 4/2007 | Ungar et al. |
| 2007/0226810 A1 | 9/2007 | Hotti |
| 2008/0250157 A1 | 10/2008 | Ohata |
| 2010/0023997 A1 | 1/2010 | Hu et al. |
| 2010/0287158 A1 | 11/2010 | Toledano et al. |
| 2010/0299522 A1 | 11/2010 | Khambete |
| 2011/0107088 A1 | 5/2011 | Eng et al. |
| 2011/0138190 A1 | 6/2011 | Chase et al. |
| 2011/0161276 A1 | 6/2011 | Krumm et al. |
| 2013/0013428 A1* | 1/2013 | Lyon ...................... G06Q 30/06 705/14.73 |
| 2013/0202222 A1 | 8/2013 | Saito |
| 2013/0238631 A1 | 9/2013 | Carmel et al. |
| 2014/0009472 A1 | 1/2014 | Ajitomi et al. |
| 2014/0040286 A1 | 2/2014 | Bane et al. |
| 2014/0053247 A1 | 2/2014 | Fadel |
| 2014/0129936 A1 | 5/2014 | Richards et al. |
| 2014/0317563 A1 | 10/2014 | O'byrne |
| 2015/0302068 A1 | 10/2015 | Morsi et al. |
| 2016/0162458 A1 | 6/2016 | Munro et al. |
| 2016/0203515 A1 | 7/2016 | Westphal |
| 2016/0266939 A1* | 9/2016 | Shear ...................... H04L 47/70 |
| 2016/0330180 A1* | 11/2016 | Egorov ................... G06F 21/14 |
| 2017/0109711 A1 | 4/2017 | Crooks et al. |
| 2017/0147796 A1 | 5/2017 | Sardesai et al. |
| 2017/0344649 A1 | 11/2017 | Vinnakota et al. |
| 2018/0089312 A1 | 3/2018 | Pal et al. |
| 2018/0129684 A1 | 5/2018 | Wilson et al. |
| 2018/0262510 A1 | 9/2018 | Su |
| 2018/0330204 A1 | 11/2018 | Kim et al. |
| 2018/0349941 A1 | 12/2018 | Taylor et al. |

FOREIGN PATENT DOCUMENTS

| | | |
|---|---|---|
| WO | 2018223077 A1 | 12/2018 |
| WO | 2018223082 A1 | 12/2018 |

OTHER PUBLICATIONS

International Search Report and Written Opinion dated Feb. 1, 2021 for PCT Application No. PCT/US20/56180, 10 pages.
International Search Report and Written Opinion dated Jan. 26, 2021 for PCT Application No. PCT/US20/56183, 13 pages.

* cited by examiner

ZERO-KNOWLEDGE OFFERS IN UNIVERSAL DATA SCAFFOLD BASED DATA MANAGEMENT PLATFORM

CROSS-REFERENCE TO RELATED APPLICATION(S)

This application claims the benefit of U.S. Provisional Patent Application No. 62/514,646, entitled "ENCRYPTED DATABASES FOR STORING DIGITAL BELONGINGS" filed on Jun. 2, 2017, which is incorporated by reference herein in its entirety.

BACKGROUND

A file hosting service (e.g., Dropbox®, Google Drive®, or Microsoft OneDrive®) is an Internet-hosted service that is specifically designed to host user files. For example, a file hosting service may allow users to upload files that could then be accessed using a different computer, tablet, mobile phone, or other network-connected device. Users often have the option of sharing files publicly or keeping files protected (e.g., by requiring authentication prior to allowing access).

Some file hosting services also permit users to collaborate on digital files, such as word processor documents, spreadsheets, and Portable Document Format (PDF) documents. But file hosting services are subject to some constraints because they store digital files having unstructured data. For example, a file hosting service will only permit a user to view those digital files for which it has a viewer corresponding to the file type (e.g., PDF documents require a viewer such as Adobe Reader®). However, because many standard compliant formats are presented by viewers as visual renderings, the file hosting service is typically unaware of what the underlying data actually means.

DETAILED DESCRIPTION

Figure 1:
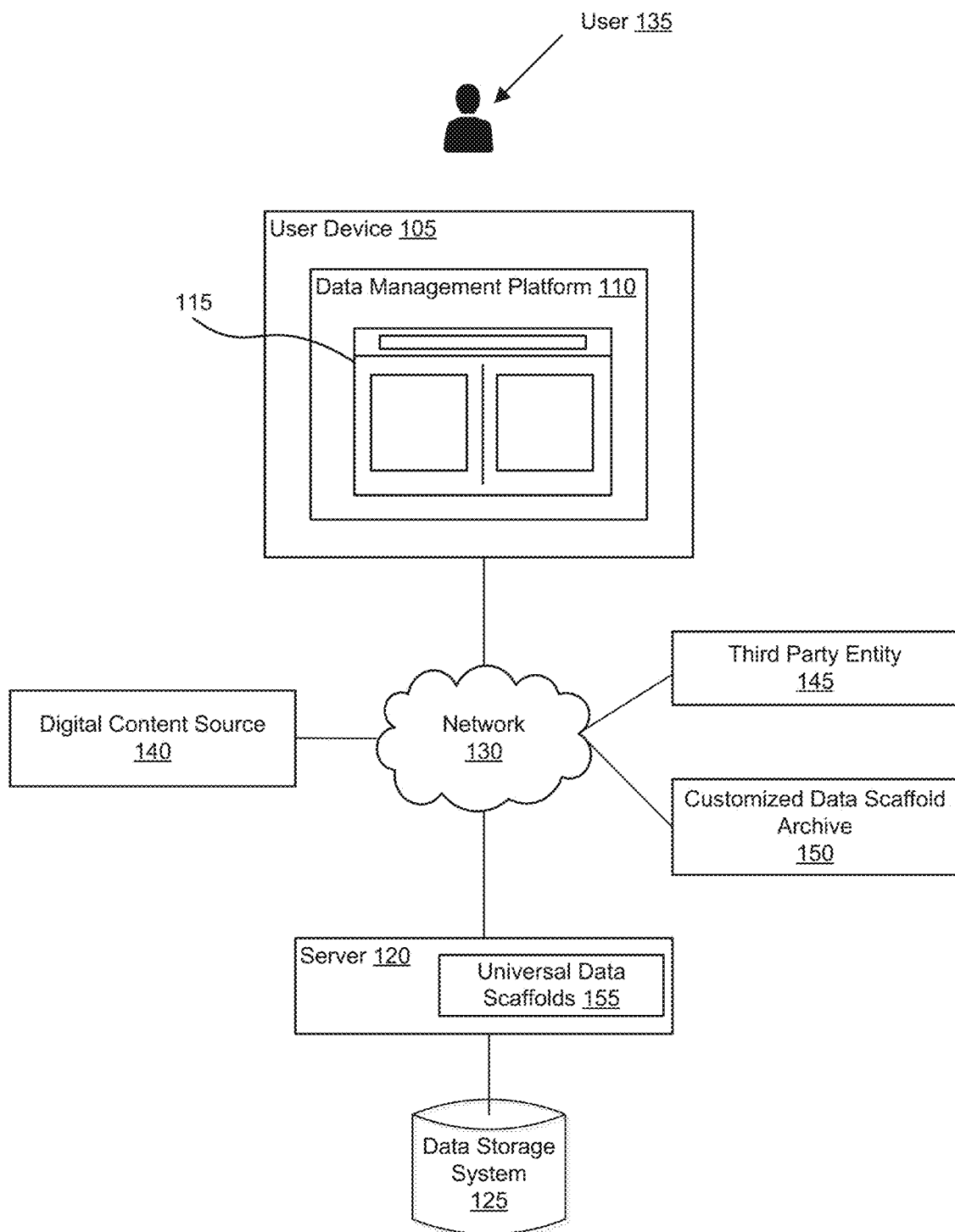
FIG. 1 is a block diagram illustrating an environment in which the disclosed embodiments can be implemented.

Disclosed are embodiments for a data management platform that provides a secure storage environment for digital content, such as digital files. The data management platform can represent the stored digital contents as a semantic graph. In the semantic graph, nodes represent digital contents and an edge between two nodes represents the relationship between the corresponding two digital contents. The semantic graph is constructed using structured data associated with the digital contents. The structured data allows the data management platform to collect, process, and present the digital contents in a graphical user interface in a more meaningful way. The data management platform also provides various other functionalities such as sharing of digital contents between users of the data management platform, presenting notifications regarding one or more aspects of a digital content, intelligent/context-based fetching or retrieval of relevant digital contents, zero-knowledge encryption of the digital contents, and generating zero-knowledge offers.

The data management platform facilitates storing of the digital content as structured data, which is defined using a universal data scaffold of the data management platform. A digital content is stored as one of multiple content types in the data management platform, and each content type is defined using a universal data scaffold. In some embodiments, a universal data scaffold includes a set of attributes that defines a content type. For example, for a content type such as a car, the universal data scaffold can include a set of attributes such as a make, a model, a year, a vehicle identification number ("VIN") of the car. When a user uploads a first digital content, such as picture of a car, or a bill of sale of the car, or creates a data record for a car, the data management platform determines the content type of the digital content as "car", obtains the universal data scaffold of "car," and obtains attribute values from the digital content, such as "Ford," "Fusion," and "2014," for the set of attributes defined in the "car" universal data scaffold.

The data management platform can have various such universal data scaffolds for multiple content types. One of the attributes in the universal data scaffold can also include a relationship attribute, which identifies a second digital content (of the same content type or another content type) related to the first digital content. For example, one of the attributes in "car" universal data scaffold can be a relationship attribute, such as "owner" or "owned by" which relates the car digital content to a "person" content type digital content. Structured data permits the relationship to be readily established between various digital contents. The universal data scaffolds can enable the data management platform to intelligently connect digital contents of different types having a common theme. For example, digital content such as documents related to a vehicle (e.g., maintenance records, driver licenses, and insurance policies) may be associated with one another and/or the individual who owns the vehicle. The connections formed between different structured data are what give the structured data its meaning.

The universal data scaffold can also be associated with other metadata, such as rules. A user can set various rules for the digital contents, such as a sharing rule that defines sharing of a digital content with another user. For example, in a universal data scaffold for a "child" content type, a parent user can set a sharing rule to share with a nanny user only a portion of digital contents related to the child, such as immunization records associated with the child.

The data management platform can be implemented in various configurations. For example, in a first configuration, the data management platform can be implemented at a server computing device ("server"), which a user can access from a user device using an application, such as a web browser on the user device. In the second configuration, a portion of the data management platform can also be implemented at the user device, for example, as an "app" that can be downloaded to and executed at the user device. The user can access the app on the user device to upload and/or retrieve digital contents to and/or from the server. Regardless of which configuration the data management platform is implemented in, the server stores all universal data scaffolds. When a user downloads and installs the app, a copy of all the universal data scaffolds that are available at the server are also installed at the user device. When a universal data scaffold is updated at the server, e.g., attributes are added, removed, and/or modified, the updated universal data scaffold is transmitted to the data management platform on the user devices, e.g., as part of an app update.

The data management platform can store the digital contents as a graph database in which digital contents are represented as nodes of the graph. A relationship between two digital contents is represented by an edge connecting the nodes corresponding to the two digital contents. A node can be a data structure that contains the digital content, attribute values of the digital content, and an edge that connects the node to another node. Note that the digital contents can be stored in formats other than graph database. For example, the digital contents can be stored in a relational database. They can be stored in any format that allows the data management platform to obtain, derive determine, or interpret the structured data associated with and relationships between the digital contents based on the universal data scaffolds. The data management platform can present the digital contents in a graphical user interface (GUI) using which the user can view, modify, and/or create digital contents. The GUI makes use of the universal data scaffold associated with a digital content to show various attributes associated with the digital content and/or any related digital contents. For example, the GUI can show a picture of the car, and attributes such as Make, Model and Year of the car, which are derived from the universal data scaffold of the car. The GUI can also show related digital content, such as a license plate of the car, which is derived from the universal data scaffold of the car, e.g., from the license plate attribute in the universal data scaffold of the car.

The data management platform also supports zero-knowledge encryption of the digital contents, in which the data management platform encrypts the digital contents prior to storing them at the data storage system ensuring security and privacy of the digital contents. For example, the app can encrypt a node corresponding to the digital content and then transmit the encrypted node to the server to back up the digital content at the data storage system. When the node is encrypted, the data management platform generates an encrypted bundle, which is typically a blob, having an encrypted form of the digital content, including the attribute values of the digital content, and the universal data scaffold of the digital content. The encrypted bundle is then transmitted to the server for storage at the data storage system. The encryption is typically done at the user device, e.g., using an encryption key that only the user device has access to. Since the server would not have access to the encrypted key used the by the user device in encrypting the digital content, the encrypted bundle cannot be decrypted at the server, therefore making the digital content secure at the server. In some embodiments, the data management platform does not encrypt the digital contents in which case the digital contents are transmitted to and stored at the server without being encrypted. In some embodiments, the data management platform can provide an option to the user to disable the encryption in which case the digital contents are transmitted to and stored at the server without being encrypted. However, the digital contents stored at the server may be less secure in such scenarios compared to scenarios where they are stored as encrypted data.

The data management platform also facilitates zero-knowledge offers in which offers of goods and/or services are stored at user devices, e.g., as part of the universal data scaffolds, but are displayed to those users who satisfy a specified criterion, and the eligible user, if interested, may then accept, reject, or ignore the offer. Neither the data management platform nor a vendor who has provided the offer may know to which users a specified offer was displayed until a user accepts the specified offer. In some embodiments, even after the user accepts the specified offer, the data management platform may anonymize the acceptance, e.g. by removing some or all user identification information, before forwarding the acceptance to the vendor. In some embodiments, a zero-knowledge offer is an offer that may only be known to the user to whom the offer was displayed until acceptance. In fact, offers may simply be stored with the underlying universal data scaffolding of the digital content with which the offer is to be presented. For example, digital content having information pertaining to a nanny (or some other employee) may include an offer for a payroll service, an offer for a background check, etc. In some embodiments, the zero-knowledge offers are included as part of the universal data scaffolds, and would be stored on the user device when the user installs the data management platform on the user device. Because these offers can be programmed into the data management platform during development, the entity responsible for providing the good/service, such as a vendor, or the data management platform may not be aware that an offer was made to a user until a notification of acceptance is received from that user.

The universal data scaffolding enables all users to use the same storage architecture and rules to create various content types. Consequently, an entity responsible for supporting the storage of various content types need not worry about users generating digital contents of different content types that are incompatible with one another. Instead, the universal data scaffold can represent shared, common content types that share a commonality across the users of data management platform in how information is mapped. Thus, each user may populate a personalized database of digital contents using universal data scaffolding that appear similar to every user. This consistency can allow the content types to be universally shared, as well as support the private delivery of analytics/intelligence.

FIG. 1 is a block diagram illustrating an environment in which the disclosed embodiments can be implemented. The environment 100 includes a data management platform 110 that facilitates storage of digital content, such as digital files, at a server 120. As described above, the data management platform 110 can be implemented in multiple configurations, and the environment 100 illustrates a configuration in which the data management platform 110 is implemented at a user device 105. The data management platform 110 allows the user 135 to perform data management operations such as upload, download, generate, modify, and/or view digital content. In some embodiments, the data management platform 110 can be an app that can be downloaded to the user device 105 from an app store, which can be hosted at a server of a third-party entity 145, and executed at the user device 105 to provide access to the server 120. The server 120 can be accessible via the network 130, such as Internet, local area network (LAN), or wide area network (WAN). The data management platform 110 provides a graphical user interface (GUI) 115 for the user 135 to perform the data management operations. In some embodiments, the data management platform 110 can be a web browser application on the user device 105. The data management platform 110 can store the digital content at the user device 105, e.g., on-device storage component. The data management platform 110 synchronizes with the server 120 to back up any new digital content uploaded or existing digital content modified by the user 135 to the server 120 for storage at a data storage system 125.

The digital content can include any multimedia content such as an image file (e.g., Joint Photographic Experts Group (JPEG) files, Tagged Image File Format (TIFF) files, and Portable Document Format (PDF) files), an audio file (e.g., Waveform Audio (WAV) files and MP3 files), a video file (e.g., QuickTime File Format (QTFF) files, Audio Video Interleaved (AVI) files, and MP4 files), a document, a data record created in the server 120, etc. The user device 105 can be any network-accessible computing device associated with a user 135, such as a mobile phone, a tablet computer, a desktop computer, a laptop computer, a wearable electronic device (e.g., a watch or fitness band), a virtual/augmented reality device, a smart television, or some other internet of things (IoT) device.

The user 135 can upload a first digital content, such as an image of a car, to the data management platform 110 using the GUI 115. The data management platform 110 determines whether the uploaded digital content is in a structured data format as defined by at least one of the multiple universal data scaffolds 155 of the server 120, e.g., a first universal data scaffold. In some embodiments, the data management platform 110 has a copy of all the universal data scaffolds 155 at the user device 105, e.g., which are bundled in the app that is downloaded to and installed at the user device 105. However, if one or more of the universal data scaffolds 155 or other ad hoc data scaffolds that are at the server 120 but not available at the user device 105, the data management platform 110 can retrieve them from the server 120. If the first digital content is not in the structured data format defined by the first universal data scaffold, the data management platform 110 transforms the first digital content to the structured data format based on the first universal data scaffold, e.g., as described at least in association with FIG. 5 below, and stores the first digital content in the user device 105. The user 135 can upload digital content to the data management platform 110 from the user device 105 and/or from one or more digital content sources 140, such as an external storage device connected to the user device 105, or online data storage services. The data management platform 110 enables the user 135 to view the digital contents in the GUI 115 example of which is described at least with reference to FIG. 7B below. The user 135 can navigate through the GUI 115 to view, edit and/or create digital content.

The data management platform 110 synchronizes the user device 105 with the server 120 to back up the digital content stored at the user device 105 to the server 120, e.g., based on a trigger condition. A trigger condition that initiates the backup of the digital content to the server 120 can include one or more of a scheduled time interval, a receipt of a command from the user 135, opening of the data management platform 110 on the user device 105, closing of the data management platform 110 on the user device 105, number of digital content that has not been backed up exceeds a specified threshold, a memory of the user device 105 consumed by the data management platform 110 exceeds a specified threshold, etc. The server 120 can store the backed up digital content at the data storage system 125.

The data management platform 110 can encrypt the digital content prior to backing them up to the server 120. For example, the data management platform 110 can encrypt a node corresponding to the first digital content and then transmit the encrypted node to the server 120 to back up the first digital content at the data storage system 125. When the node is encrypted, the data management platform 110 generates an encrypted bundle having an encrypted version of (a) the first digital content, including attribute values of the first digital content, and (b) the first universal data scaffold of the first digital content. However, in some embodiments, the universal data scaffolds in the encrypted bundles may not be encrypted as they are not private to a specific user and common across the users of the data management platform 110. The encrypted bundle is then transmitted to the server 120 for storage at the data storage system 125.

The server 120 co-ordinates or facilitates various data management operations performed by the user 135. For example, the server 120 responds to storage requests from the user 135 by storing the encrypted digital content received from the user device 105 at the data storage system 125. The server 120 can also respond to data access requests from the user 135 by retrieving the digital content from the data storage system 125 and forwarding them to the user device 105. The server 120 manages digital contents of multiple users in which each user has a separate user account or user profile at the server 120. The server 120 may store digital contents of multiple users in the data storage system 125.

The server 120 also facilitates zero-knowledge offers in which offers of goods and/or services are stored at user devices but are displayed to those users who satisfy a specified criterion, and the eligible user, if interested, may then accept, reject, or ignore the offer. Neither the server 120 nor a vendor, e.g., one of the third-party entities 145, who provided the offer to the server 120 to be distributed to the users may know to which users a specified offer was displayed until a user accepts the specified offer.

The data management platform 110 is also compatible with data storage archives that are designed based on customized data scaffolds. A customized data scaffold archive 150 manages digital content that are structured based on customized data scaffolds, that is, a data scaffold that is different from the universal data scaffold defined in the data management platform 110. For example, a car dealer may want to have a different data scaffold for a car than the universal data scaffold defined for a car by the data management platform. That is, the customized data scaffold can have a first set of attributes defining a car, whereas the universal data scaffold may have a second set of attributes. The data management platform 110 includes an application programming interfaces (APIs) that enable importing and/or exporting digital content from/to the customized data scaffold archive 150 while still maintaining the structured data associated with the digital content. The APIs can determine differences between the two data scaffolds (e.g., universal data scaffold for a car and the customized data scaffold for the car), obtain attribute values for any attributes that need to have a value but don't, and store the digital content with the corresponding structured data accordingly. In some embodiments, the customized data scaffold archive 150 can be created by the same entity as the data management platform 110 and then offered to another entity, e.g., a buyer such as an organization, for sale.

Figure 2:
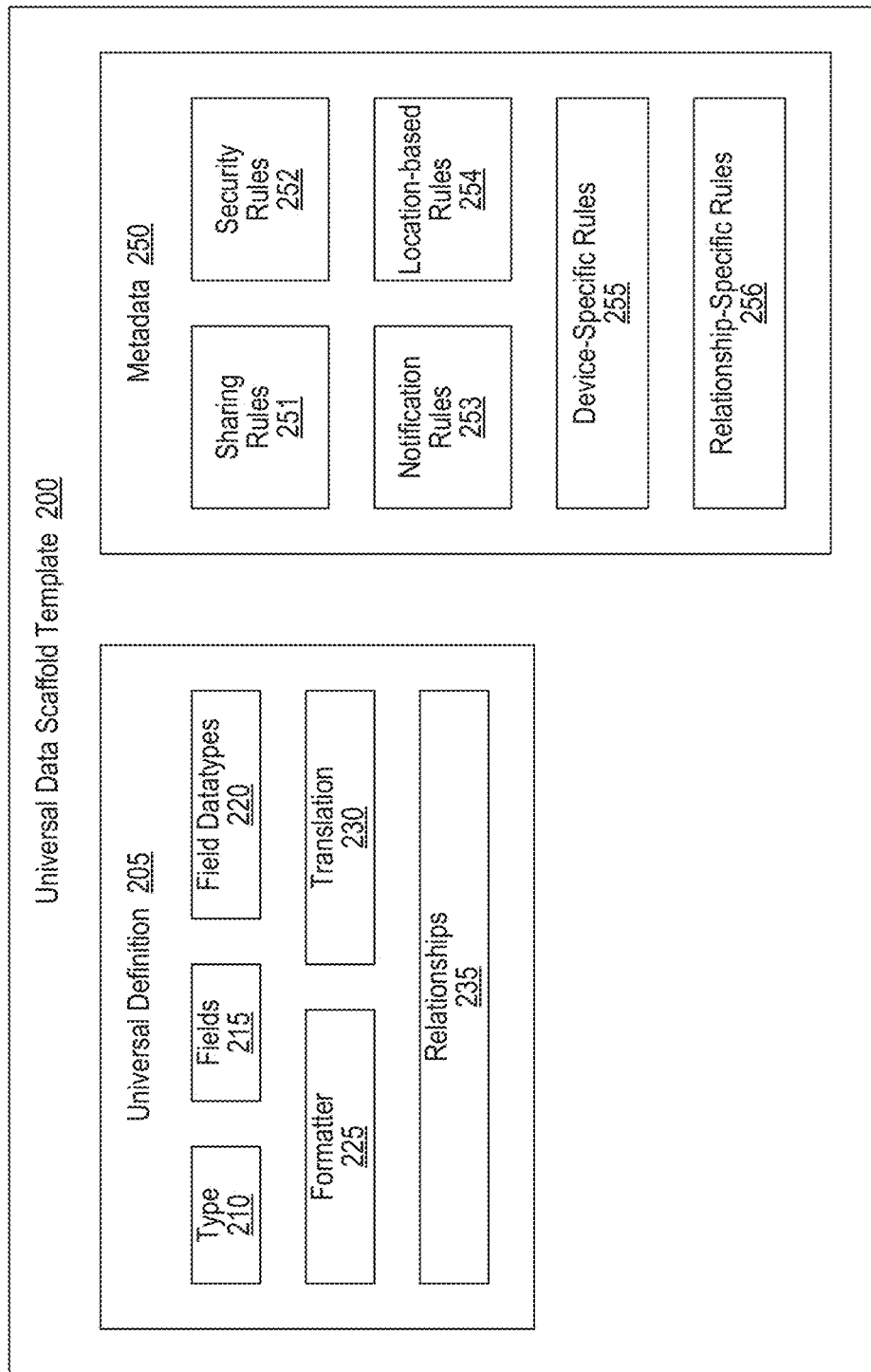
FIG. 2 is a block diagram of a universal data scaffold template implemented by the data management platform of FIG. 1, consistent with various embodiments.

FIG. 2 is a block diagram of a universal data scaffold template 200 implemented by the data management platform of FIG. 1, consistent with various embodiments. Structured data allows the data management platform 110 to collect, process, and present information in a more meaningful way. For example, if the user 135 uploads a digital content indicating that they own a vehicle, the data management platform 110 may begin analyzing other digital content to identify a driver license of a primary driver, a license plate, insurance documentation, etc., related to the vehicle. Such an analysis and/or intelligence of the data management platform 110 is made possible using a universal data scaffold, which defines a structured data format for digital belongings to be stored by the data management platform.

A universal data scaffold is defined based on universal data scaffold template 200, which includes universal definition 205 and metadata 250. The universal definition 205 provides a template of variables for defining a set of attributes of a content type. For example, the universal definition 205 includes a type variable 210 that is used to define a content type; a field variable 215 to define one or more attributes of the content type; a field data type variable 220 to define a data type of the attributes; a formatter variable 225 to define a format in which the content type is to be displayed; a translation variable 230 to define translation for one or more attributes; and a relationship variable 235 to define relationship with other digital contents.

The metadata 250 provides various settings and/or rules using which the user can customize the behavior of digital content in the data management platform 110. The sharing rule 251 can be used by the user to set rules for sharing a digital content with other entities, e.g., another user or another user device of the same user. For example, a first user, such as a parent of a child, can define a sharing rule 251 to share a subset of digital contents associated with the child, e.g., immunization records, with another user, such as a nanny.

The security rule 252 can be used to set rules regarding access permissions for a digital content for various entities. For example, the parent can define a security rule 252 to provide the nanny read-only access to the immunization records.

The notification rules 253 can be used to set rules regarding generating notifications. For example, the parent can define a notification rule 253 to generate a notification on a user device associated with the parent, when the child is up for a particular vaccination, which can be determined based on the immunization records stored in the server 120. The notification rule 253 also enables the user to set a frequency of the notification, a timing of the notification of an event prior to the occurrence of the event, etc.

The location-based rule 254 allows the user to define any location-specific rules. For example, the parent can define a location-based specific rule 254 to display a specified digital content, e.g., the immunization record or a doctor's note from a previous visit, when the parent is at or near a pediatrician's clinic, which can be determined based on location-based services in the user device carried by the parent.

The device-specific rule 255 can be used to set rules specific to a particular user device. For example, the parent user can set a device-specific rule 255 rule for showing a specified digital content by default when the data management platform 110 is opened at the user devices, such as to show a first digital content in a first user device and a second digital content in a second user device.

The relationship-specific rules 256 can be used by the user to set rules based on a specified relationship between the digital contents, or between users of the data management platform 110. For example, a first user, e.g., father of a child, can set a relationship-specific rule 256 to share all digital content associated with the child of the first user with a second user, e.g., a mother of the child.

Note that the universal data scaffold template 200 is not limited to the above universal definition 205 and the metadata 250. The universal definition 205 can have more or less definitions, and the metadata can have more or less rules, and other settings associated with the digital content.

Figure 3:
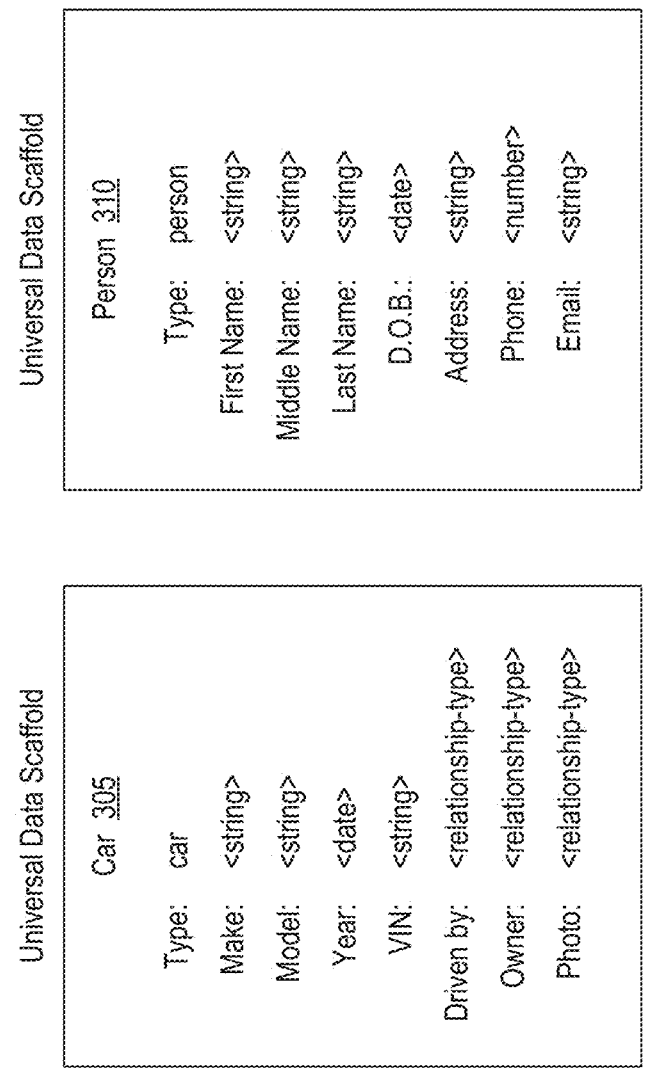
FIG. 3 is a block diagram illustrating examples of universal data scaffold for multiple content types, consistent with various embodiments.

FIG. 3 is a block diagram illustrating examples of universal data scaffold for multiple content types, consistent with various embodiments. The data management platform 110 supports storing digital content of various content types and each content type is defined using a universal data scaffold. A car universal data scaffold 305, which is defined using the universal data scaffold template 200, includes a set attributes that defines a digital content of the type "car." For example, the set of attributes that defines the content type "car" include "make," which is of data type string, "model," which is of data type string, "year," which is of data type date, and "VIN" which is of data type string. When a user stores a digital content of content type of "car" in the data management platform 110, the data management platform 110 obtains attribute values for the above attributes defined in the car universal data scaffold 305, e.g., either by prompting the user to manually provide the above attribute values or by automatically analyzing the digital content, which is described at least with reference to FIG. 5. For example, when the user 135 uploads a first digital content, such as picture of a car, or a bill of sale of the car, the data management platform 110 can analyze the digital content to identify the content type as "car", and obtain attribute values from the first digital content for the attributes make, model, and year as "Ford," "Fusion," and "2014," respectively.

The car universal data scaffold 305 further includes relationship attributes such as "driven_by," "owner" and "photo" which define a relationship with other digital content, such as a person who drives the car, a person who owns the car, and a photo of the car, respectively. That is, the relationship attribute can identify a digital content related to the first digital content. Further, the related digital content can be of the same content type as the first digital content or of different content type. For example, the first digital content, such as a Ford Fusion car of the above example, can have a second digital content of type "person," which can be a data record of the user "John," as an attribute value of the relationship attributes "driven_by" and the "owner," and a third digital content of type "photo" can be an attribute value of the attribute "photo." In some embodiments, it is because of such relationships between different digital contents or content types, the data management platform 110 can mine the data storage system 125 for determining related digital content and link/or connect the related digital content. In some embodiments, the data management platform 110 will also prompt the user 135 when the user 135 uploads a digital content of the first content type to identify a related digital content, which can be of the same or different content type, in which such a determination is made based on the relationship attributes defined in the universal data scaffold for the first content type.

Note that some attributes of the car universal data scaffold 305, such as make, model, year and VIN, are native to the content type to which the universal data scaffold corresponds, e.g., direct values of the digital content, while other attributes, such as "driven_by," "owner," and "photo" are of derived type, e.g., values are derived from other content type. Further, note that not all attributes of a universal data scaffold may have attribute values. For example, the user 135 may not input, or the data management platform 110 may not determine, a value of a particular attribute, e.g., VIN, of the car universal data scaffold 305. In some embodiments, the universal data scaffold may define at least some attributes as mandatory, which requires the user to input the value if the data management platform 110 is not able to determine one.

The car universal data scaffold 305 is defined based on the universal data scaffold template 200. For example, the type "car" corresponds to the type variable 210, the attributes make, model, year and VIN corresponds to the field 215 variable and the data types of the attributes correspond to the field data type variable 220, and the relationship attributes "driven_by," "owner," and "photo" correspond to the relationship variable 235. The universal data scaffold template 200 also allows the user 135 to define ad hoc relationships between digital contents. Note that a universal data scaffold may not define all variables of the universal data scaffold template 200. The car universal data scaffold 305 can also include metadata (not illustrated), such as the metadata 250, which includes various settings and/or rules that the user can set or customize. In some embodiments, the rules in the metadata can have default values, which the user 135 can choose to customize.

FIG. 3 also illustrates a person universal data scaffold 310, which is used to define a content type "person." That is, the person universal data scaffold 310 defines structured data associated with a person, and can include attributes such as a first name, middle name, last name, date of birth, address, email, and phone. The user 135 can use the person universal data scaffold 310 to store information associated with a person. A digital content of type "person" can be created in various ways, e.g., by uploading a picture of a person, identification document of a person, or just by creating a data record of the person in the GUI 115. For example, a digital content of type "person" for a user, John, can have attribute values such as "John," "M.," "Grisham," "Dec. 31, 1899" for the attributes a first name, middle name, last name, and date of birth, respectively, defined in the person universal data scaffold 310. In the example of car universal data scaffold 305, John can be represented as the driver and owner of the ford fusion car by linking the first digital content, which represents the Ford Fusion car, with the second digital content, such as a data record of John, by inputting the attribute values of the relationship attributes "driven_by" and the "owner," as "person.p1," wherein "person" is content type of the second digital content and "p1" is an object identifier of the second digital content. Note that the above syntax is just for illustration and various other forms of representation may be used for specifying a digital content as an attribute value.

The universal data scaffolding enables the data management platform 110 to make intelligent determinations because the universal data scaffolding is common across the users of the data management platform 110. For example, the data management platform 110 may be able to determine when the driver license, license plate, lease term, or insurance coverage will expire, and then take appropriate action, such as generating a notification at the user device 105 reminding the user 135 to renew the driver's license.

Figure 4:
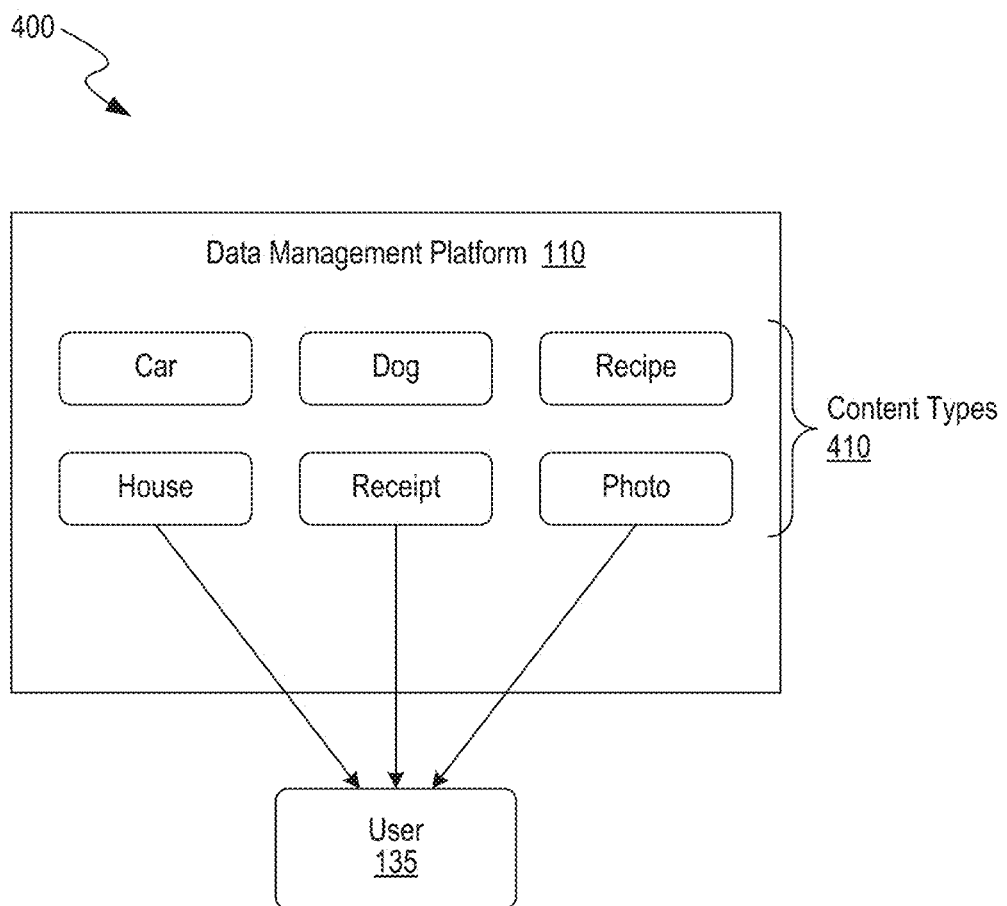
FIG. 4 is a block diagram illustrating an example of various content types supported by the data management platform, consistent with various embodiments.

The data management platform 110 defines various such universal data scaffolds for different content types. FIG. 4 is a block diagram illustrating an example 400 of various content types supported by the data management platform 110, consistent with various embodiments. The user 135 can upload digital content of many content types, e.g., content types 410, to the data management platform 110. In the example 400, the content types 410 supported by the data management platform 110 include a car, a dog, a recipe, a house, a receipt, and a photo. Each of the content types 410 is defined using a separate universal data scaffold. For example, the content type "car" is defined using the car universal data scaffold 305 of FIG. 3. Similarly, the content type "dog" can be defined using a dog universal scaffold, which can include attributes such as a breed, name, date of birth, photo, medicine, tag, Vet, walker, and genetic test. By building a storage archive of digital content of various content types 410, and structuring the digital content using the universal data scaffolds, the data management platform 110 can make intelligent determinations about various aspects of the digital content, such as keeping track of various dates and generating notification reminders and/or making recommendations to the user 135. For example, if the user 135 has stored digital content of type "dog," such as pictures and/or information about a dog of the user 135, the data management platform 110 can make a recommendation to the user 135 to get a genetic test done for the dog in an event the data management platform 110 determines that there are no attribute values associated with the attribute "genetic test" of the dog universal data scaffold.

Figure 5:
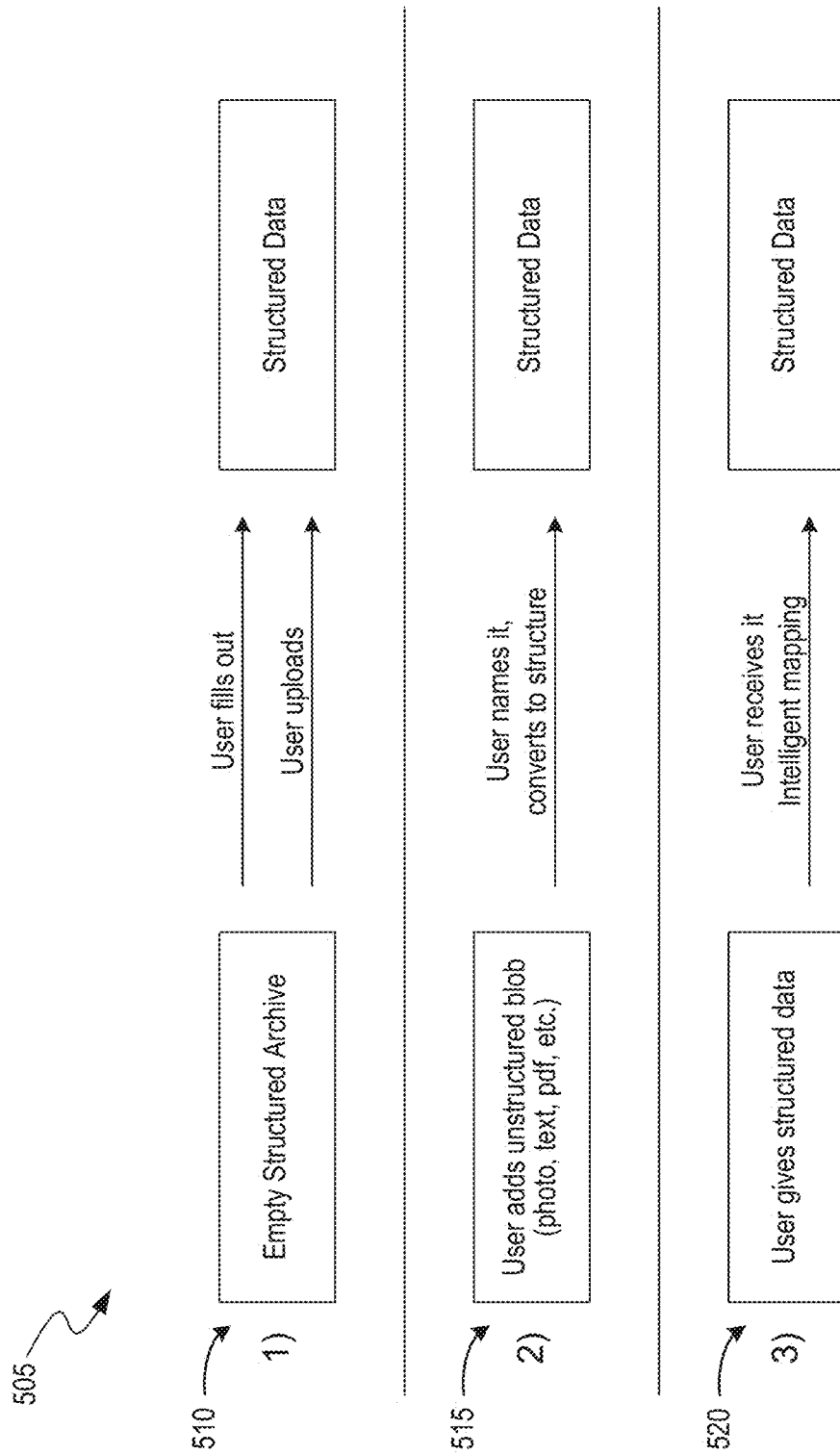
FIG. 5 is a block diagram of examples of structuring digital content uploaded to the data management platform based on the universal data scaffolds, consistent with various embodiments.

FIG. 5 is a block diagram of examples of structuring digital content uploaded to the data management platform 110 based on the universal data scaffolds, consistent with various embodiments. In the examples 510-520, the data management platform 110 receives the digital content, analyzes the digital content to determine if any transformation to structured data is necessary, transforms, if necessary, the unstructured data to structured data based on a universal data scaffold associated with the content type of the digital content, and then stores the digital content in association with the universal data scaffold.

In the first example 510, the data management platform 110 identifies a content type of the digital content based on one or more input fields using which the user 135 inputs data associated with the digital content, and then stores the digital content in association with a universal data scaffold of the identified content type. The GUI 115 can provide different sets of input fields for receiving data of different content types. That is, certain input fields may be directly associated with certain universal data scaffold. Accordingly, by the virtue of the user 135 entering information in those fields, the data management platform 110 may inherently understand the content type and the structure of the data being entered. For example, the GUI 115 can include a first set of input fields configured to receive data for content type "car." The data management platform 110 determines that any data input using the first set of input fields is structured data associated with the content type "car," and therefore, stores that structure data in association with the car universal data scaffold.

Figure 6:
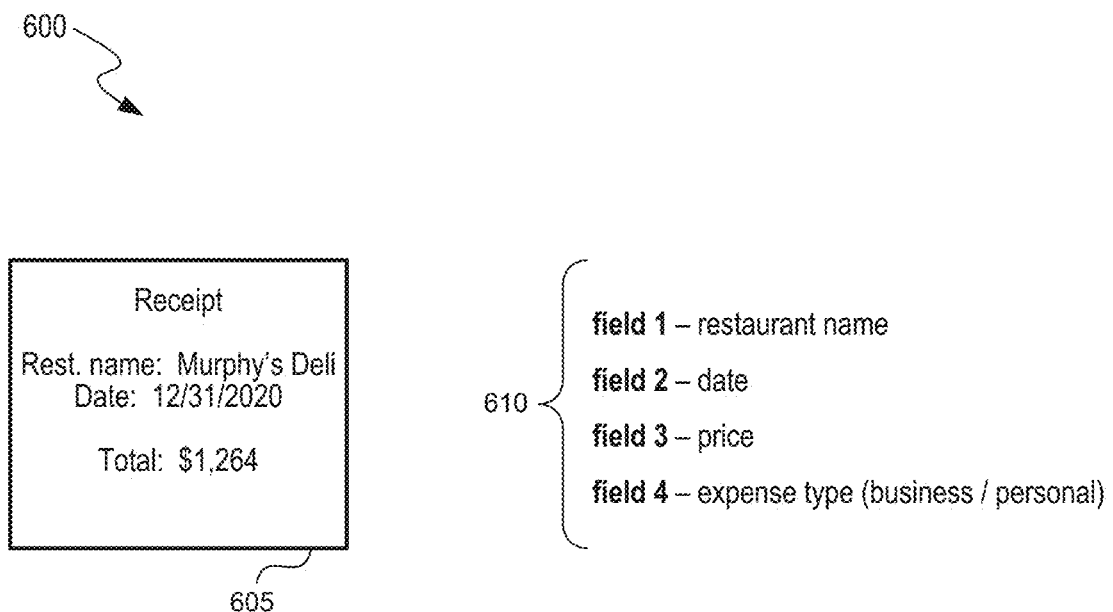
FIG. 6 is a block diagram of an example of analyzing unstructured data associated with digital content to transform the unstructured data to a structured data of a specified content type, consistent with various embodiments.

In the second example 515, the data management platform 110 determines the content type of the uploaded digital content automatically, prompting the user 135 to identify the content type, or a combination. FIG. 6 is a block diagram of an example 600 of analyzing unstructured data associated with digital content to transform the unstructured data to a structured data of content type "receipt," consistent with various embodiments. The user 135 can upload an image file 605, which is a scan of a restaurant bill. The data management platform 110 can analyze the image file 605 using various techniques, e.g., optical character recognition (OCR), and identify the word "Receipt," "bill" or the like in the image file 605, and determine the image file 605 to be of content type "receipt." The data management platform 110 can also determine the content type based on at least one of user input, machine learning techniques, or deductive inference rules. After determining the content type, the data management platform 110 can then retrieve the receipt universal data scaffold, which is a universal data scaffold defined for content type "receipt," and determine a set of attributes 610 of the receipt from the receipt universal data scaffold, such as a restaurant name, date, price, and expense type. The data management platform 110 can continue to analyze the image file 605 to obtain or extract attribute values for the set of attributes 610. For example, the data management platform 110 can obtain the values for the attributes restaurant name, date, and price as "Murphy's Deli," "Jun. 2, 2017" and "$1264," respectively. However, the data management platform 110 may not obtain the value for the attribute expense type. The data management platform 110 may prompt the user 135 to identify the expense type and receive the value from the user 135. Thus, the data management platform 110 has transformed the unstructured data associated with the image file 605 to structured data of a content type "receipt" based on the receipt universal data scaffold.

In the example 600, the data management platform 110 determined some attribute values automatically and some by seeking input from the user 135. In some embodiments, the data management platform 110 may automatically determine the necessary information in determining the structured data and not seek any input from the user 135. For example, if the expense type is not a mandatory field, the data management platform 110 can end the analysis process after determining the attribute values for the other attributes (e.g., restaurant name, date, and price) and store the structured data. In some embodiments, the data management platform 110 can be even more interactive with the user 135 in determining the necessary information for generating the structured data. For example, if the data management platform 110 is not able to automatically determine the content type, the data management platform 110 may present a question such as "What is this content? Please choose content type" and present a list of content types for the user 135 to choose from. In some embodiments, the data management platform 110 may have automatically determined the content type as "receipt" but the accuracy of the determination may be below a predefined threshold, and therefore, the data management platform 110 can present a question such as "Is this a receipt? Please confirm or choose another content type." The data management platform 110 can continue to ask the user 135 to confirm after each attribute value is determined or all at once.

Continuing with FIG. 6, in yet another example, the data management platform 110 can be configured, e.g., using one of the rules in metadata associated with receipt universal data scaffold, to request if the user 135 wants to add a mileage receipt if the expense type of the restaurant bill is "business." The degree of automation, or in other words, interaction between the user 135 and the data management platform 110, in transforming the unstructured data to structured data can be configured by the user 135, e.g., in one of the setting options provided by the data management platform 110. For example, the degree of automation can be configured in three different levels as "low," "medium," and "high" in which low indicates a lowest of three levels of automation—the number of questions presented to the user may be above a first threshold, "high" indicates a highest level of automation—the number of questions presented to the user 135 may be below a second threshold (second threshold being lower that first threshold), and "medium" indicates a level of automation between "low" and "high"— the number of questions presented to the user 135 may be between the first and second thresholds.

Referring back to FIG. 5, in the third example 520, the user 135 inputs the digital content of a specified content type in a structured format, and the data management platform 110 intelligently identifies the content type and stores the digital content in association with the universal data scaffold defined for the corresponding content type. For example, the user 135 can specify that the user is uploading an image file of a W2 document, or the data management platform 110 analyzes the W2 document, e.g., using OCR, to determine the image file is of type "W2," and the data management maps the image file to the W2 universal data scaffold. The data management platform 110 continues to analyze the W2 document, e.g., using OCR, to obtain the attribute values of the attributes defined in the W2 universal data scaffold, and stores the structured data, e.g., the image file and attribute values, in association with the W2 universal data scaffold. In some embodiments, the user 135 can receive a digital content in structured data format from another user of the data management platform 110 and upload the received digital content to the data management platform 110. In such embodiments, the data management platform 110 can readily identify the structured data based on the universal data scaffold associated with the received digital content, and store it accordingly.

Structured data allows the data management platform 110 to collect, process, and present information in a more meaningful way. For example, if the user 135 uploads a digital content, such as an image of a car or a data record of the car, indicating that they own a vehicle, the data management platform 110 may begin analyzing other digital content to identify a driver license of a primary driver, a license plate, insurance documentation, etc., related to the vehicle. The data management platform may automatically link those digital contents as related to the car, prompt the user 135 to confirm that the documents are indeed related, or even prompt the user 135 to identify the related documents. Such an analysis and/or intelligence of the data management platform 110 is made possible by the use of a universal data scaffold.

Figure 7A:
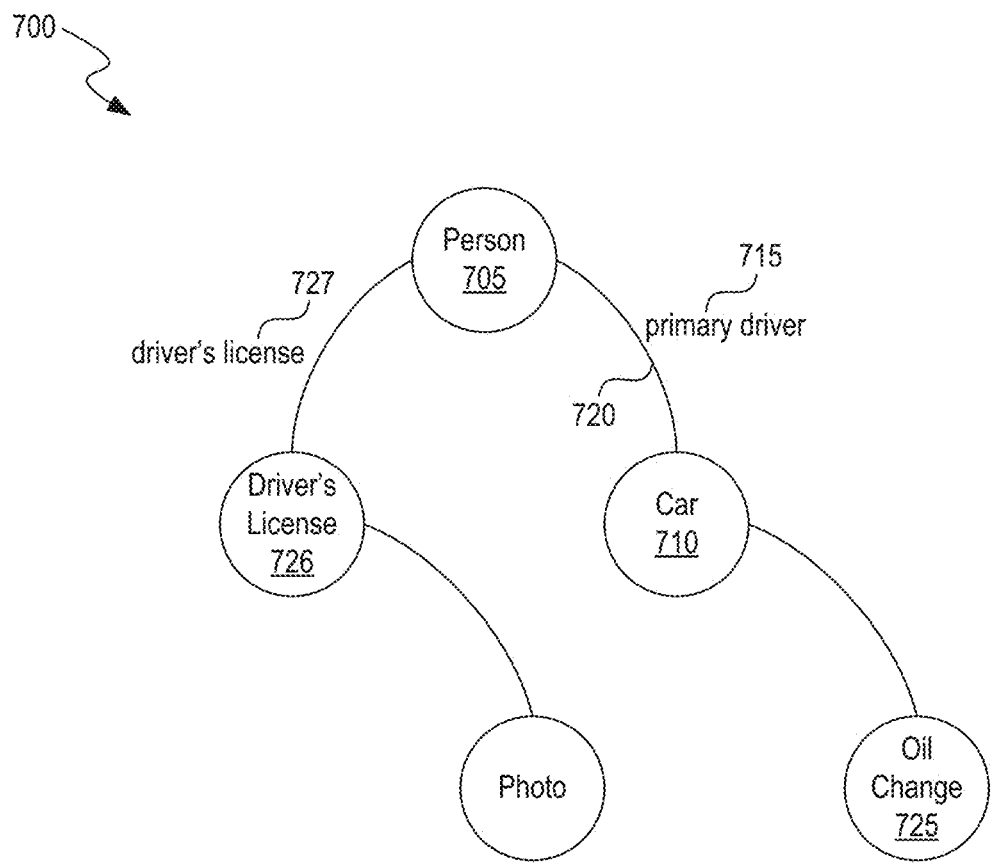
FIG. 7A is an example of a graph of the digital contents associated with a user, consistent with various embodiments.

FIG. 7A is an example of a graph 700 of the digital contents associated with a user, consistent with various embodiments. As described above, the digital contents are stored in the data storage system 125 as a graph database, for example as graph 700. The graph 700 represents digital contents as nodes, and relationships between the digital contents as edges connecting the nodes. For example, the graph 700 represents a first digital content, such as a data record or photo of a person, as a first node 705, a second digital content, such as a data record or photo of a car, as a second node 710, and a third digital content, such as an oil change receipt, as a third node 725. Further, an edge 720 connecting the first node 705 and the second node 710 indicates a relationship 715 of "primary driver" between the digital content corresponding to the nodes in which the person corresponding to the first node 705 is a primary driver of the car corresponding to the second node 710.

Figure 7B:
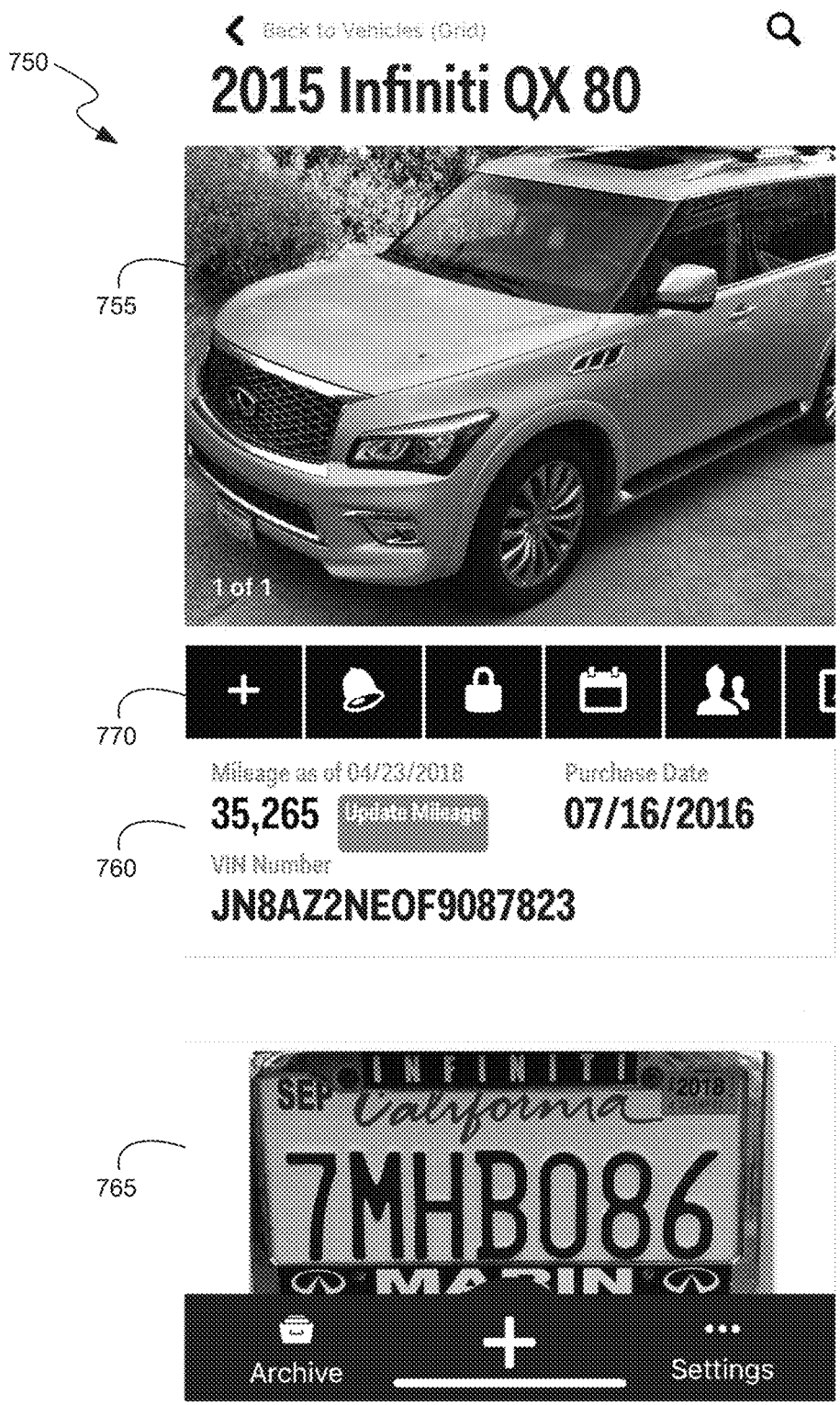
FIG. 7B is an example of a graphical representation of the digital contents in a graphical user interface, consistent with various embodiments.

FIG. 7B is an example of a graphical representation 750 of the digital contents in a GUI, consistent with various embodiments. In some embodiments, the graphical representation 750 can be generated in the GUI 115. The graphical representation 750 includes a digital content such as a picture 755 of a car, and multiple attributes 760 of the car, such as mileage, purchase date and VIN of the car. The picture 755, and attributes 760 and their values can be obtained from the graph 700, e.g., second node 710. The graphical representation 750 also displays a license plate picture 765 of the car, which can be obtained from the second node 710 if the license plate is defined as an attribute of the car, or from another node (not illustrated) of the graph 700 if the license plate is defined as a related digital content.

The graphical representation 750 also includes a tool bar 770 that provides several GUI elements using which the user 135 can perform several data management operations, such as add or remove a picture, change attribute values associated with the digital content displayed in the graphical representation 750, or identify related digital content. In some embodiments, at least some of the operations allowed by the tool bar 770 are context sensitive to the type of digital content displayed in the graphical representation 750, which is determined based on the universal data scaffold the digital content is associated with. For example, if the content type is a car such as the car 755 in the graphical representation 750, then based on the car universal data scaffold 305, the tool bar 770 can allow the user 135 to perform operations pertinent to the content type "car" such as viewing additional pictures of the car 755; viewing/editing a primary driver or owner associated with the car 755; viewing/editing attribute values associated with the car 755; viewing/editing maintenance records associated with the car 755; viewing/editing important dates associated with the car 755, such as an expiration date of the registration of the car; etc. In another example, if the content type of the digital content displayed in the graphical representation 750 is a "person", then based on the person universal data scaffold 310, the tool bar 770 can allow the user 135 to perform operations including viewing additional pictures of the person; viewing/editing attributes associated with the person such as a first name, middle name, last name, a photo of the person; viewing/editing contact details; viewing/editing family or friends information associated with the person; viewing/editing important dates associated with the person, such as birthday, wedding anniversary, etc. Note that the graphical representation 750 can include GUI elements other than the tool bar 770, which can provide the same operations as the tool bar 770 or different operations.

Figure 7C:
FIG. 7C is another example of a graphical representation of the digital contents in a GUI, consistent with various embodiments.

FIG. 7C is another example of a graphical representation 775 of the digital contents in a GUI, consistent with various embodiments. The graphical representation 775 includes a digital content such as a picture 776 of a car, and multiple attributes 777 of the car, all of which can be obtained from a graph of the digital contents, such as second node 710 of the graph 700. The graphical representation 775 also displays a license plate picture 779 of the car, which can be obtained from the second node 710. The graphical representation 775 also displays information regarding a primary driver of the car 776, which can be obtained from the first node 705 based on the relationship 715. The graphical representation 775 also displays information regarding a primary driver 778 of the car 776, which can be obtained from the first node 705 based on the relationship 715, and a picture of the driver's license of the primary driver 778, which can be obtained from the third node 726 based on the relationship 727.

Figure 7D:
FIG. 7D is another example of a graphical representation of the digital contents in a GUI, consistent with various embodiments.

FIG. 7D is another example of a graphical representation 780 of the digital contents in a GUI, consistent with various embodiments. The graphical representation 780 includes the picture 776 of the car, the license plate picture 779 of the car and a first section 781 that displays information regarding insurance policy of the car 776, which can be obtained from a specified node (not illustrated) related to the second node 710 based on the relationship such as "insurance policy." The graphical representation 780 also displays the insurance policy documents 782, which can be obtained from the specified node. In some embodiments, the user 135 may navigate to the graphical representation 780 by scrolling the graphical representation 775.

Figure 7E:
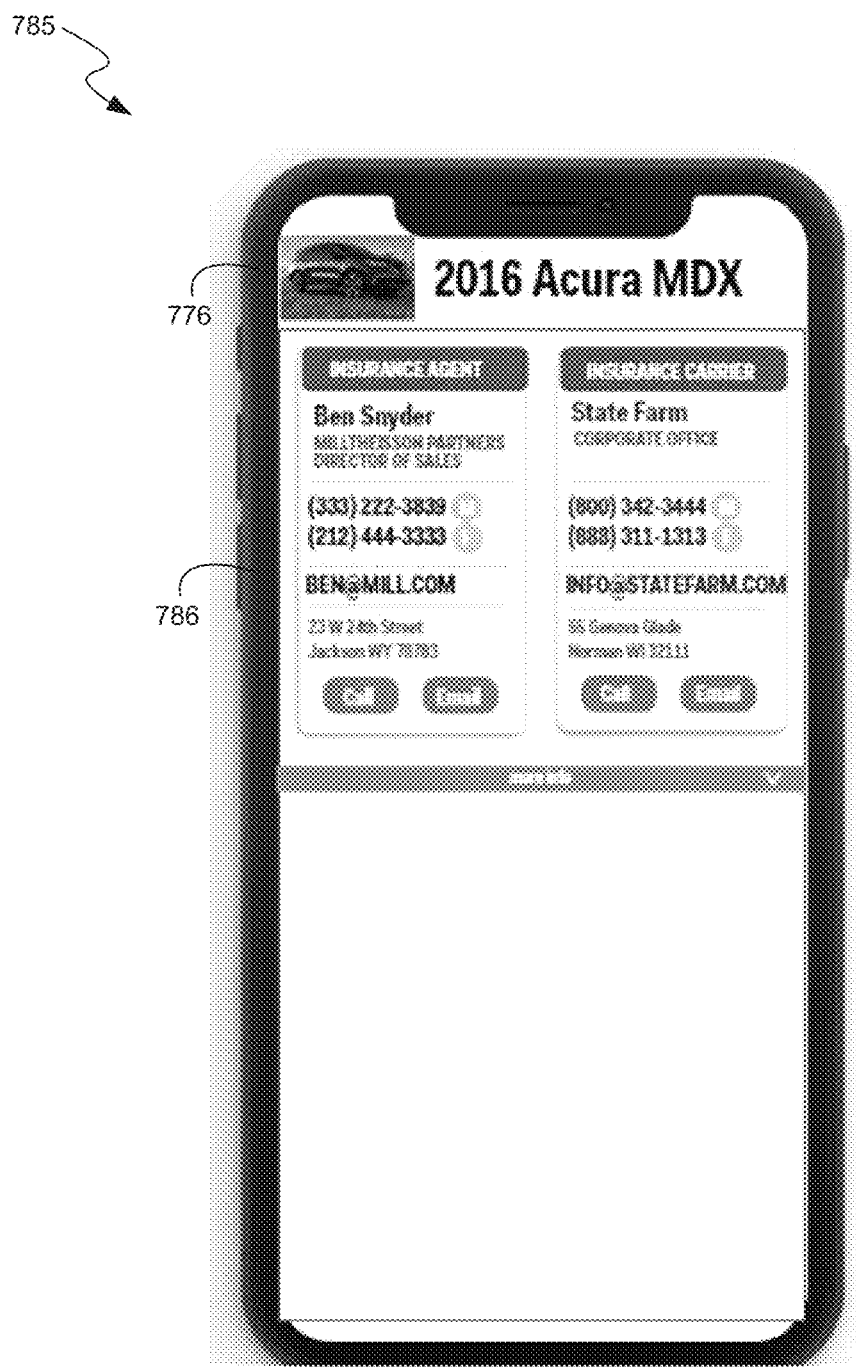
FIG. 7E is another example of a graphical representation of the digital contents in a GUI, consistent with various embodiments.

FIG. 7E is another example of a graphical representation 785 of the digital contents in a GUI, consistent with various embodiments. The graphical representation 785 includes the picture 776 of the car and a second section 786 that displays information regarding the insurance policy of the car 776, such as insurance agent and carrier, which can be obtained from a specified node (not illustrated) related to the second node 710 based on the relationship such as "insurer." In some embodiments, the user 135 may navigate to the graphical representation 785 by selecting one of the GUI elements in the graphical representation 780.

In some embodiments, the data management platform 110 downloads or caches a subset of the digital content associated with the user 135 at the user device 105. The user 135 may navigate through the graphical representation 750 to view different digital contents and if a digital content is not stored in the user device 105, then the data management platform 110 obtains the digital content from the server 120. For example, in the graphical representation 750 if the user 135 selects an option from the tool bar 770 to view information regarding the owner or the primary driver of the car, and if the corresponding data, e.g., the first node 705, is not stored at the user device 105, the data management platform 110 can fetch the first node 705 from the server 120, and then retrieve the details of the owner, such as a picture and name of the owner, from the first node 705, and display the details of the owner in the graphical representation 750.

In some embodiments, the data management platform 110 can display some of the digital contents in the graphical representation 750 by default, e.g., when the data management platform 110 is opened by the user 135. The data management platform 110 can select the digital contents to be displayed by default regardless of whether the user 135 requested for them. The selected digital contents are fetched from the server 120 and cached at the user device 105. The selection can be done based on context associated with the user 135, such as, the geographical location the user 135 is at, the date/day/time of the year/month/week, another user the user 135 is with, most frequently viewed digital content, most recently viewed digital content, digital content indicated as favorite, based on chronological order of the digital content added, based on a prediction that the user 135 may access a specified digital content (which can be determined based on a data access pattern of the user 135), any other real-time characteristic associated with the user 135, such as relevance of a current occasion, date, time, day, year, geographical location, etc. For example, if the user 135 is at a particular place, such as "Golden Gate" bridge in San Francisco, Calif., USA, the graphical representation 750 may display pictures that were captured at or near the Golden Gate bridge. In another example, if the user 135 is at a pediatrician clinic, and if the data management platform 110 determines that the user 135 has stored digital content associated with a child, such as immunization records of the child, results of lab tests, or medical reports, the graphical representation 750 may display the corresponding digital content. In still another example, the data management platform 110 may determine on a specific day that a year ago on the same date, the user 135 was vacationing in Hawaii, and the graphical representation 750 may display pictures associated with the vacation in Hawaii. In still another example, the data management platform 110 may determine that a specific day is a birthday of the user 135, and the graphical representation 750 may display on the birthday of the user 135 pictures associated with prior birthday celebrations of the user 135. In yet another example, if the data management platform 110 determines that the user 135 is with another user of the data management platform 110, a second user, the graphical representation 750 may display digital content associated with both the users, e.g., pictures of occasions that are associated with both the users such as a get-together of both the users. In some embodiments, the user 135 may also customize the display settings in the data management platform 110 that indicates user-defined criteria for selecting digital content to be displayed in the graphical representation 750 by default.

The structured data associated with the digital content, which is generated based on universal data scaffolds of the corresponding content type, enables the data management platform 110 to identify the related digital content, relationships between the digital content and generate the graphical representation 750. By representing the digital content as a semantic graph, such as in the graph 700, the data management platform 110 gives more meaning and/or context to the digital content hosted by the data management platform 110. The user 135 can make more meaningful use of the digital content. For example, while the second node 710, which corresponds to a car has structured information such as a first name, middle name, last name, a photo of the person, the relationships the second node 710 has with other nodes is what gives the structured data its context or meaning, such as (a) the car is driven by the person corresponding to the first node 705 and (b) oil change was performed on the car as indicated by the third node 725. In another example, the user 135 can quickly and easily navigate to the node corresponding to the driver's license, and open the driver's license to review, e.g., check the expiration date on the driver's license.

In some embodiments, the user 135 can share a digital content with another user of the data management platform 110. For example, a specified user can request the data management platform 110 at the specified user's user device to obtain a group of digital contents associated with the user 135. When the data management platform 110 on the user device 105 receives the request, the data management platform 110 at the user device 105 determines based on the metadata, e.g., sharing rules, associated with the universal data scaffolds of the group of digital contents, whether the group of digital contents can be shared with the specified user. In an event the data management platform 110 at the user device 105 determines that the group of the digital contents can be shared with the specified user, the data management platform 110 sends a message having the group of the digital contents to the specified user's user device. In some embodiments, the message can be sent to the specified user's user device via the server 120. The data management platform 110 at the specified user's user device receives the message, and performs the necessary operations to merge the received group of digital contents with the digital contents associated with the specified user, e.g., based on the universal data scaffolds associated with the digital contents being merged, and displays the group of digital contents to the specified user, e.g., in the graphical representation 750.

Figure 8:
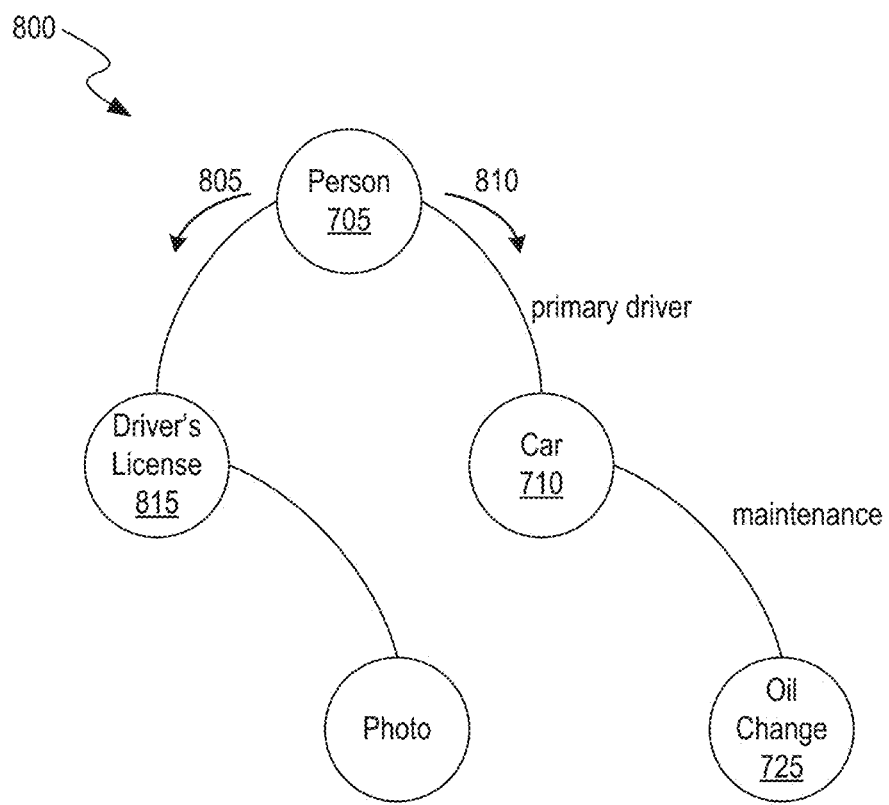
FIG. 8 is a block diagram of an example for generating recommendations based on intelligence derived from a graph of the digital contents, consistent with various embodiments.

FIG. 8 is a block diagram of an example for generating recommendations based on intelligence derived from a graph 800 of the digital contents, consistent with various embodiments. In some embodiments, the graph 800 is similar to the graph 700 of FIG. 7A, and the graph 800 may contains a subset of the entire digital content associated with the user 135. The data management platform 110 can make use of the structured data associated with the digital content and the relationships between the nodes in the graph 800 to derive various types of intelligence, and generate recommendations, offers and/or notifications based on the derived intelligence. For example, the data management platform 110 can analyze the graph 800 to make a recommendation for a scenario such as "Is there a car that has not had maintenance in 3 months?" and if so, generate a recommendation to recommend the user 135 to get the maintenance work done on the car. The data management platform 110 can also generate a notification that reminds or alerts the user 135 that a maintenance is due soon or past due. Furthermore, the data management platform 110 can also present an offer for maintenance work from a particular vendor (e.g., one of the third-party entities 145) to the user 135.

In some embodiments, to derive intelligence for such scenarios, the data management platform 110 can navigate the graph 800 in various paths (e.g., series of edges) and test for the presence/absence of nodes, and filter on attributes of the nodes and edges. For example, to derive the intelligence for the above scenario, the data management platform 110 navigates a first path 810 from first node 705 to third node 725 to determine if the person is associated with a car, and since the person is associated with the car as indicated by the second node 710 the data management platform 110 proceeds to determine if the car is associated with a maintenance record, and since the car is associated with a maintenance record as indicated by the third node 725, the data management platform 110 proceeds to determine from the attributes of the third node 725 a date of the recent most maintenance. If the date of the maintenance is outside of 3 months, the data management platform 110 can proceed with generating a recommendation for the user 135, which can be displayed to the user 135 in the GUI 115.

In another example, the data management platform 110 can similarly navigate a second path 805 from first node 705 to the fourth node 815 to determine if the person's driver license is due to expire in a specified period, e.g., 3 months, and if so, generate an appropriate recommendation.

In some embodiments, each such scenario can be expressed as a query, and the result of the query is what triggers the data management platform 110 to make a recommendation or extend an offer.

Figure 9:
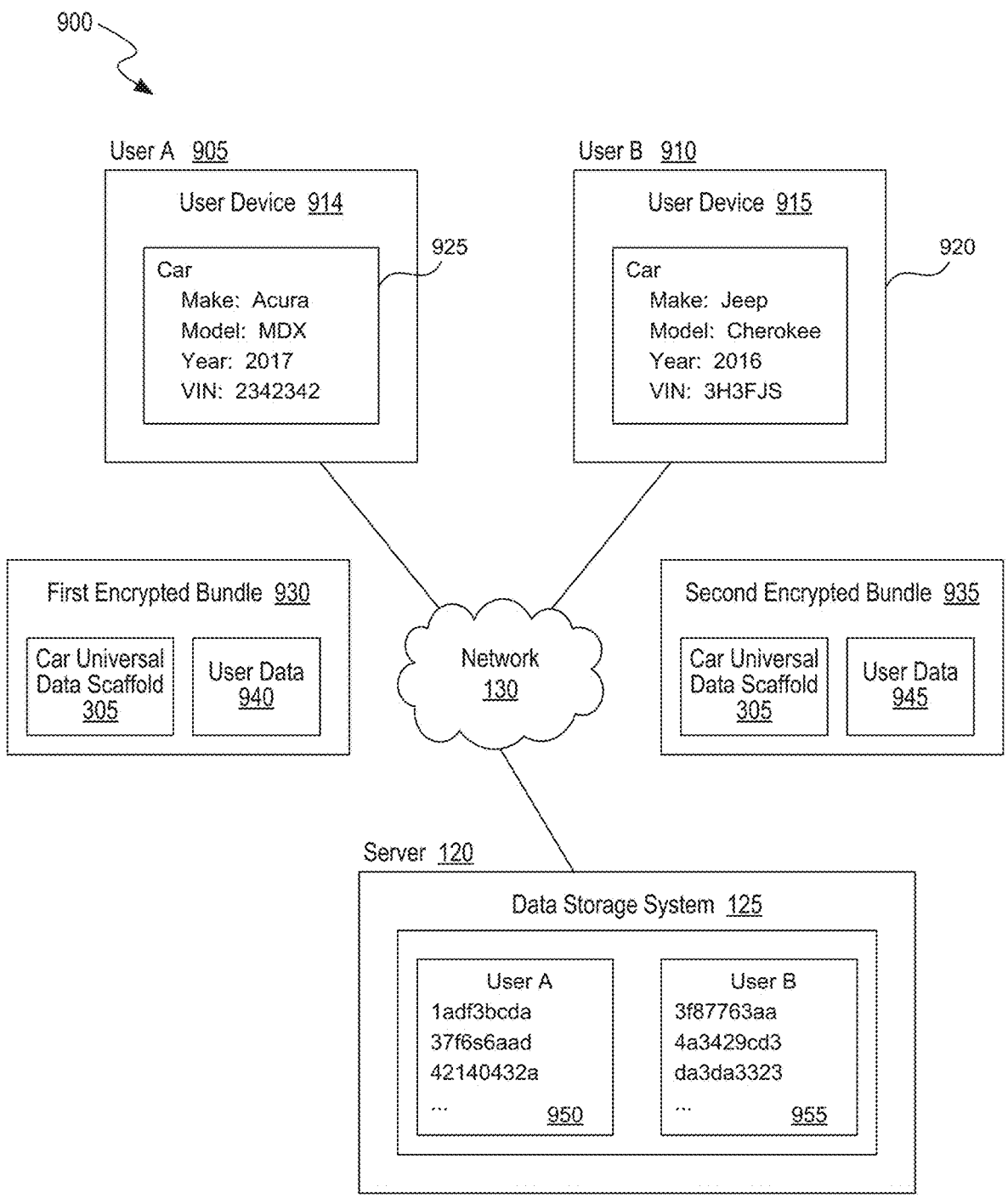
FIG. 9 is a block diagram of zero-knowledge encryption of digital content, consistent with various embodiments.

FIG. 9 is a block diagram of zero-knowledge encryption 900 of digital content, consistent with various embodiments. In some embodiments, the zero-knowledge encryption 900 can be implemented in the environment 100 of FIG. 1. The data management platform 110 encrypts the digital content associated with the user 135 prior to backing them up to the server 120 so that the digital content stored at the server 120 is secure. In some embodiments, the data management platform 110 performs the encryption using zero-knowledge encryption 900, which means that the digital content is stored at the server 120 in an encrypted bundle and the server 120 has no knowledge of the encrypted contents of the encrypted bundle since the server 120 does not have access to an encryption key used for encrypting the digital content at the user device 105.

In the zero-knowledge encryption 900 of FIG. 9, digital contents of two users, such as user A 905 and user B 910 are encrypted. The user A 905 uploads a first digital content 925 from a user device 914, and user B 910 uploads a second digital content 920 from a user device 915. In some embodiments, the users 905 and 910 are similar to user 135 of FIG. 1 and the user devices 914 and 915 are similar to user device 105 of FIG. 1. Further, each of the user devices 914 and 915 can have a copy of the data management platform 110 installed and executing at the corresponding user device. The first digital content 925 and the second digital content 920 are both of content type "car" and therefore, associated with a car universal data scaffold, such as the car universal data scaffold 305 of FIG. 3.

The data management platform 110 stores the digital contents as a graph database in which the digital contents are represented as nodes of the graph. A node can be implemented as a data structure that contains the digital content, attribute values of the digital content, and an edge that connects the node to another node. An edge can be implemented as a data structure that contains the two nodes, which the edge connects, as the attributes of the edge data structure.

In backing up the first digital content 925 to the server 120, the data management platform 110 at the user device 914 encrypts a first node corresponding to the first digital content 925, e.g., using an encryption key, to generate a first encrypted bundle 930. The first encrypted bundle 930, which is typically a blob, includes the car universal data scaffold 305 associated with the first digital content 925, and user data 940 associated with the first digital content 925. The user data 940 includes an encrypted version of the first digital content 925 (e.g., if the first digital content 925 is an image file having a picture of a car, then encrypted version of the image file), including encrypted version of the attribute values of the first digital content 925, e.g., "Acura," "MDX," "2017," and "2342342." The first encrypted bundle 930 is then transmitted to the server 120 for storage at the data storage system 125, e.g., in a storage block 950 allocated to user A 905. The encryption is done at the user device 914, e.g., using an encryption key that only the user device 914 has access to. Since the server 120 would not have access to the encrypted key used the by the user device 914 in encrypting the first digital content 925, the first encrypted bundle 930 cannot be decrypted at the server 120, therefore making the digital content secure at the server 120.

Similarly, the data management platform 110 at the user device 915 encrypts a second node corresponding to the second digital content 920, using an encryption key whose access is restricted to the user device 915, to generate a second encrypted bundle 935. The second encrypted bundle 935 includes the car universal data scaffold 305 associated with the second digital content 920, and user data 945 associated with the second digital content 920, such as an encrypted version of the second digital content 920 and attribute values of the second digital content 920, e.g., "Jeep," "Cherokee," "2016," and "3H3FJS." The second encrypted bundle 935 is transmitted to the server 120 for storage at the data storage system 125, e.g., in a storage block 955 allocated to user B 910.

Note that while the user data can be different for different users for digital contents of the same type, the car universal data scaffold included in the two encrypted bundles are the same as the car universal data scaffold is common across all users of the data management platform 110.

Figure 10:
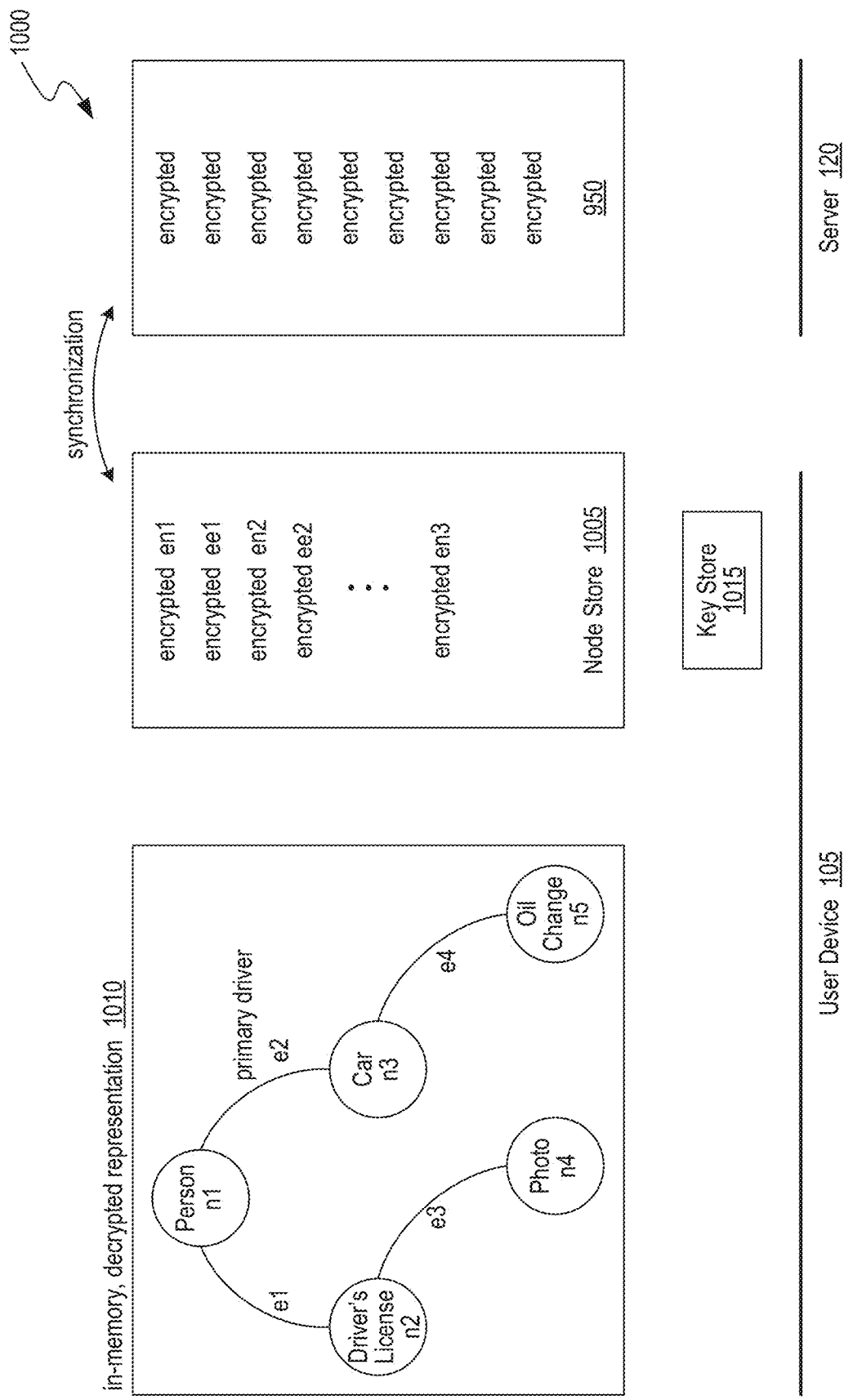
FIG. 10 is a block diagram of an example of storing encrypted bundles in the data management platform and a server, consistent with various embodiments.

FIG. 10 is a block diagram of an example 1000 of storing encrypted bundles in the data management platform 110 and the server 120, consistent with various embodiments. In some embodiments, the example 1000 can be implemented in the environment 100 of FIG. 1, and using the zero-knowledge encryption 900 of FIG. 9. As described above, the data management platform 110 can store the digital content in a graph database as nodes and edges. For example, the five digital contents depicted in the decrypted representation 1010, which can be similar to the graph 700 of FIG. 7A, are stored as five nodes with node identifiers n1-n5 and the four relationships between the nodes are stored as four edges with edge identifiers e1-e4 in a cache memory of the user device 105.

When the user device 105 is synchronized with the server 120, the nodes and edges are encrypted to generate encrypted bundles, and then transmitted to the server 120 for storage as encrypted bundles. In the example 1000, the storage block 950 at the server 120, e.g., more specifically at the data storage system 125 associated with the server 120, stores the encrypted bundles of all the digital content associated with the user 135.

Although the data management platform 110 backs up the encrypted bundles from the user device 105 to the server 120, the data management platform 110 can store encrypted bundles of a subset of the digital content of the user 135 on the user device 105. The example 1000 illustrates a node store 1005 on the user device 105 which stores the encrypted bundles having identifiers en1-en5 corresponding to the nodes n1-n5, respectively, and encrypted bundles having identifiers ee1-ee5 corresponding to the edges e1-e4, respectively (not all encrypted bundles of the nodes n1-n5 and edges e1-e4 are illustrated in the figure). The user device 105 can also have a key store 1015, which stores a mapping of the node identifiers to the encrypted bundle identifiers, and a mapping of the edge identifiers to the encrypted bundle identifiers.

In some embodiments, the data management platform 110 determines the subset of the digital content to be stored at the user device 105, e.g., based on the context associated with the user 135 as described at least with reference to FIG. 7 above, and stores the encrypted bundles of the selected subset.

In some embodiments, the data management platform 110 generates a separate encrypted bundle for each node and edge. By generating separate encrypted bundles for each node and edge, the data management platform 110 facilitates efficient retrieval of the digital content from the server 120, e.g., retrieving one or more digital contents that are requested as opposed to being restricted to retrieving the digital contents as a group regardless of whether or not all digital contents in the group are requested. Such an efficient retrieval minimizes (a) the storage space consumed at the user device 105, (b) the network bandwidth consumed in the retrieval, and (c) the time consumed in retrieving the required digital content.

Figure 11:
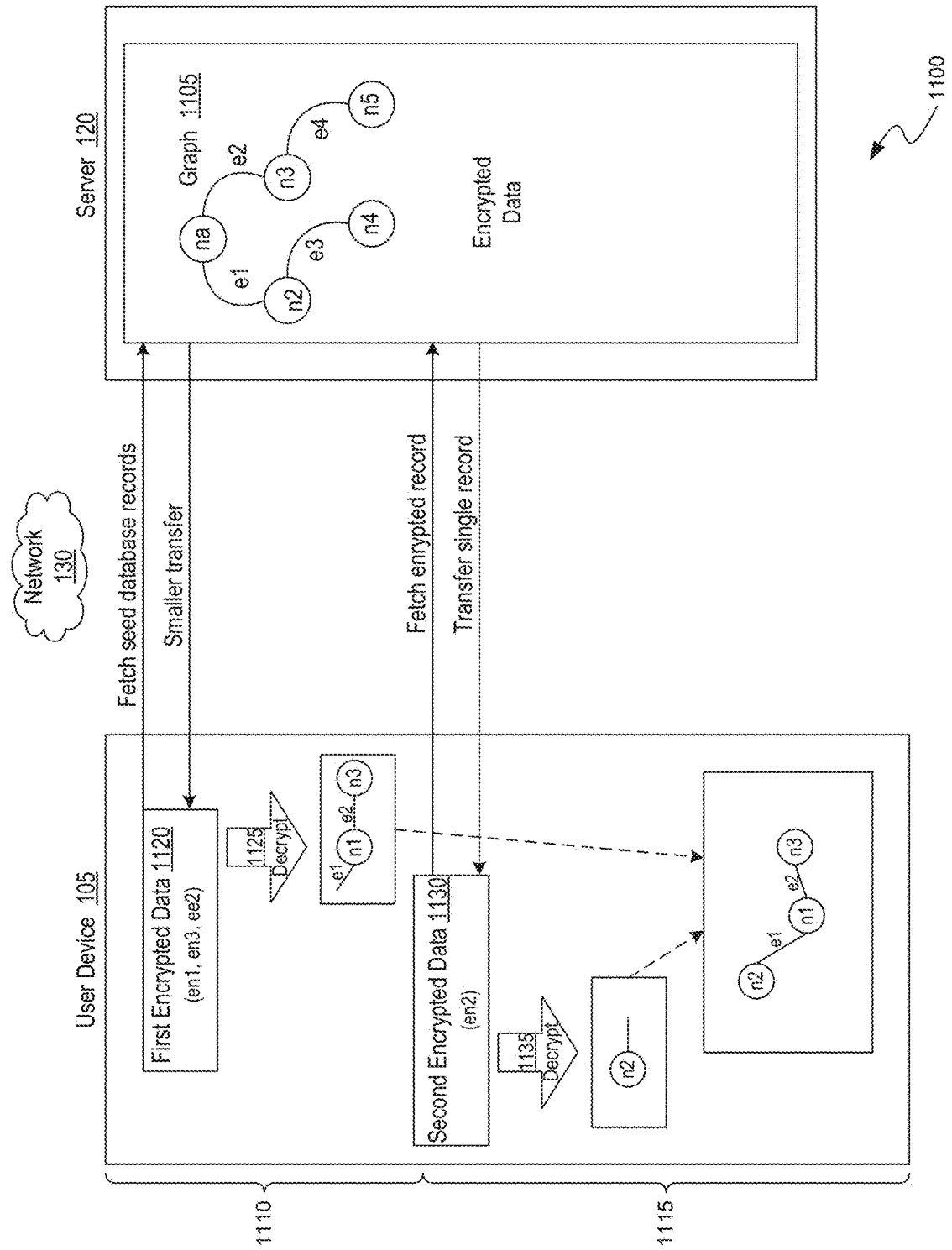
FIG. 11 is an example illustrating zero-knowledge data retrieval from the server, consistent with various embodiments.

FIG. 11 is an example 1100 illustrating zero-knowledge data retrieval from the server 120, consistent with various embodiments. In some embodiments, the example 1100 may be implemented in the environment 100 of FIG. 1. Consider that the server 120 stores the encrypted bundles of digital content corresponding to the graph representation 1105. That is, the server 120 is storing encrypted bundles en1-en5 of the digital content represented by the nodes n1-n5, respectively, and encrypted bundles ee1-ee4 of the relationships represented by the edges e1-e4, respectively.

In a first phase 1110, the data management platform 110 fetches a subset of the digital content as seed records, which are the digital content to be displayed by default in the GUI 115 or the digital content which the user may shortly request to access. In some embodiments, the seed records can be determined based on the context associated with the user 135, e.g., as described at least with reference to FIG. 7 above. In some embodiments, the encrypted bundles of the seed records are retrieved from the server 120 and stored at the user device 105 regardless of whether the user 135 requests those seed records. In the example 1100, consider that data management platform 110 determines digital content represented by nodes n1 and n3 as seed records, and therefore, retrieves the encrypted data 1120, which includes encrypted bundles, en1 and en3, of the nodes n1 and n3, and encrypted bundle, ee2, of edge e2. The data management platform 110 decrypts 1125 the encrypted data 1120 to generate the nodes n1, n3 and edge e2. When the user 135 accesses the GUI 115 to view the digital contents, the data management platform 110 displays the nodes n1, n3 and the edge e2 connecting the nodes n1 and n2 in the GUI 115. The first phase 1110 can be triggered at various instances, e.g., when the context associated with the user 135 changes.

In the second phase 1115, which can be triggered when the user 135 requests for accessing one or more digital contents, the user 135 requests for a digital content corresponding to node n2. The data management platform 110 determines if the node n2 is available at the user device 105, e.g., in the cache memory or the on-device storage. If the node n2 is available at the user device 105, the data management platform 110 presents the digital content corresponding to the node n2 in the GUI 115. On the other hand, if the node n2 is not available, the data management platform 110 determines the encrypted bundle identifier of the node n2, e.g., using the mapping stored in the key store 1015 of FIG. 10, requests the server 120 to retrieve the encrypted bundle en2. After receiving the second encrypted data 1130, which includes the encrypted bundle en2, the data management platform 110 decrypts 1135 the second encrypted data 1130 to generate the node n2. After decrypting the node n2, the data management platform 110 also retrieves the edge IDs of the edges e.g., edge e1, associated with the node n2, determines if those edges are available at the user device 105 (e.g., downloaded as part of seed records), and in the event they are not available, requests the server 120 to retrieve those edges as well. After the encrypted bundles of the edges are received, the data management platform 110 decrypts the encrypted bundles of the edges to generate the edges, e.g., edge e1, and then based on the information in the edge e1, the data management platform 110 connects the nodes n1 and n2 with the edge e1 in the GUI 115.

Figure 12:
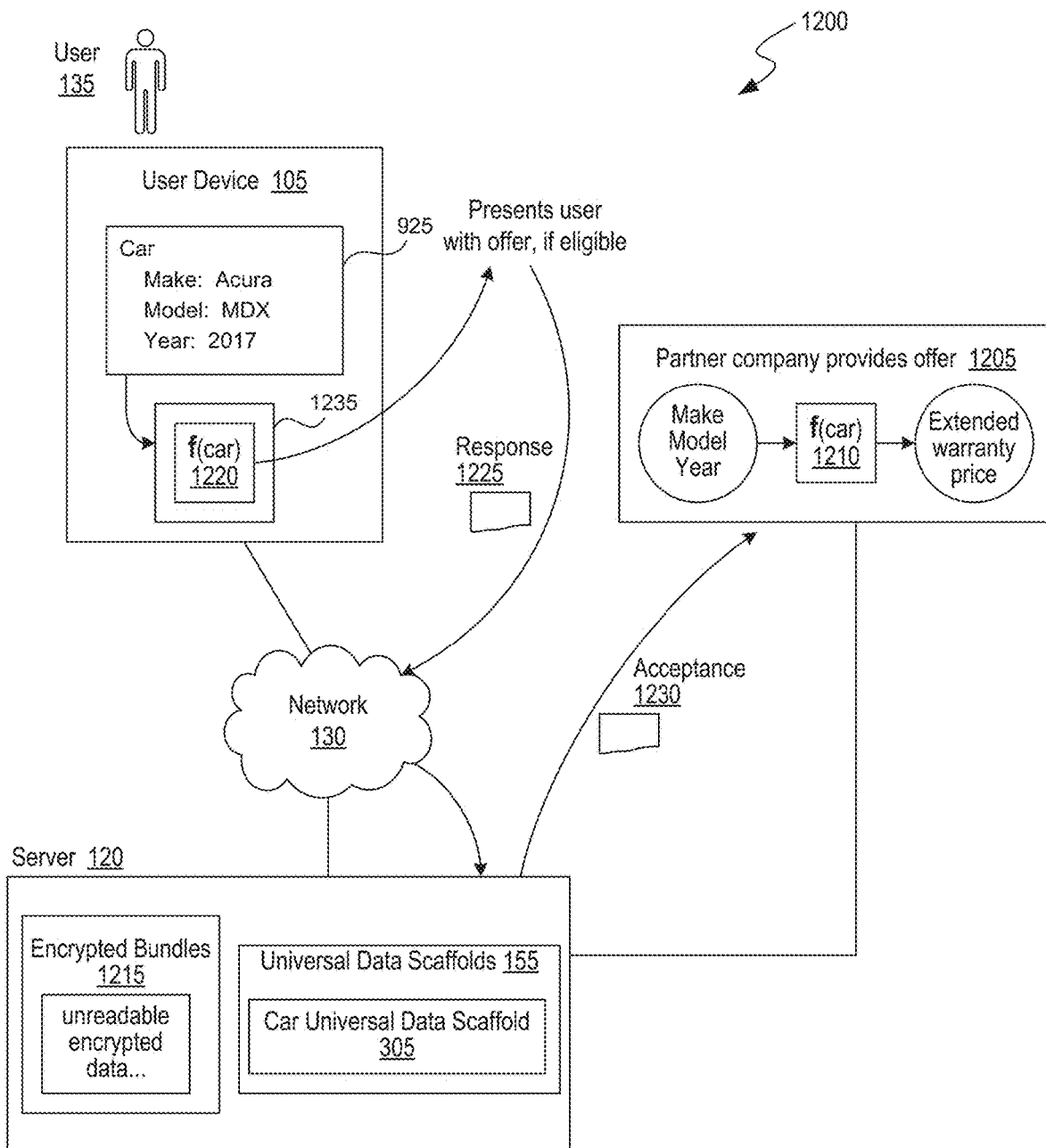
FIG. 12 is a block diagram of an example for presenting offers to users of the data management platform, consistent with various embodiments.

FIG. 12 is a block diagram of an example 1200 for presenting offers to users of the data management platform, consistent with various embodiments. In some embodiments, the example 1200 may be implemented in the environment 100 of FIG. 1. The data management platform 110 also facilitates zero-knowledge offers in which offers of goods and/or services are stored at user devices, e.g., as part of the universal data scaffolds 155, but are displayed to those users who satisfy a specified criterion, and an eligible user, if interested, may then accept, reject, or ignore the offer. Neither the server 120 nor a vendor, e.g., one of the third-party entities 145, who has provided the offer may know to which users a specified offer was displayed until a user accepts the specified offer. In some embodiments, a zero-knowledge offer is an offer that may only be known to the user to whom the offer was displayed until acceptance. An offer just resides on the user devices until the criterion for displaying the offer is satisfied, which is when the offer is presented to the user. No privacy or security of the users are compromised from the zero-knowledge offers. The server 120 stores users' data as encrypted bundles 1215, which can be similar to the encrypted bundles 930 and 935, the contents of which are not readable either by the server 120 or the vendors.

The server 120 receives offers from vendors, e.g., the third-party entities 145, such as an offer 1205 for an extended warranty for a car, to be presented to multiple users of the data management platform 110. The offer 1205 can also include a vendor-defined criterion 1210, which defines the criterion for displaying the offer 1205 to a user. For example, the vendor-defined criterion 1210 can indicate that the offer 1205 is to be presented to users having a car that is older than a specified year, e.g., 2018. In some embodiments, the server 120 redefines or reformulates the vendor-defined criterion 1210 to be compliant with the definition of universal data scaffolds 155. For example, the server 120 can incorporate the appropriate attribute of the car universal data scaffold 305, such as "carUDS.YEAR<2017," in which "carUDS" is the identifier of the car universal data scaffold and "YEAR" is the attribute of the car universal data scaffold 305 in the criterion 1210 to generate a server-defined criterion 1220. Note that the above syntax is just for illustration and various other forms of representation may be used for generating the server-defined criterion 1220. Further, note that the criterion for displaying the offer can be based on attributes of multiple digital contents, and is not restricted to attributes of just one digital content. The server 120 then generates a program code 1235 having the offer 1205 and the server-defined criterion 1220, and includes the program code 1235 as part of the car universal data scaffold 305.

When the users install the data management platform 110 on their user devices, e.g., by downloading the data management platform app to the user device, the universal data scaffolds 155 are downloaded to and stored at the user devices. So, the program code having the offers would also be stored on the user devices as part of the universal data scaffolds 155. For example, the program code 1235 having the offer 1205 will be stored as part of the car universal data scaffold 305 at the user devices. The program code 1235 is executed in the data management platform 110 at the corresponding user devices. For example, the user device 105 executes the program code 1235 in the data management platform 110. Upon execution, the program code 1235 monitors the attribute values of the first digital content 925 to determine if the first digital content 925 satisfies the server-defined criterion 1220, and in an event the attribute values satisfy the server-defined criterion 1220, the program code 1235 presents the offer 1205 to the user 135 in the GUI 115. For example, the program code 1235 determines that the attribute value of the attribute YEAR in the first digital content 925, which is "2017" is less than "2018," and therefore, satisfies the server-defined criterion 1220.

The user 135 can choose to accept, reject, or ignore the offer 1205. If the user 135 chooses to accept the offer 1205, a response 1225 indicating the acceptance is sent from the user device 105 to the server 120. The server 120 can forward the response 1225 as an acceptance 1230 of the offer 1205 to the vendor of the offer 1205. The server 120 or the vendor may not know until the user 135 has accepted the offer if the offer 1205 was displayed to the user 135, or to which the users the offer 1205 was displayed. In some embodiments, even after the user 135 accepts the offer 1205, the data management platform 110 may anonymize the response 1225, e.g. by removing some or all user identification information of the user 135, before transmitting the response 1225 to the server 120, which may be forwarded as an acceptance 1230 to the vendor. However, in some embodiments, some user identification may be necessary by the server 120 to have the offer 1205 serviced by the vendor. In such cases, the response 1225 may not be anonymized but the acceptance 1230 which is forwarded to the vendor may be anonymized. In some embodiments, some user identification may be necessary either by the server 120 or the vendor to honor the offer 1205, and in such cases, user identification information may be transmitted with the acceptance 1230 to the vendor, but after obtaining permission from the user 135 to share the user identification information with the vendor.

In some embodiments, the data management platform 110 or the server 120 may anonymize the offer 1205, e.g., by removing identification information of the vendor, before presenting the offer 1205 to the user.

In some embodiments, the server 120 can receive multiple offers for the same service or a product from multiple vendors. The server 120 can define an offer-selection criterion to select an offer from the multiple competing offers, determine the offer that satisfies the offer-selection criterion, and include the selected offer, e.g., as program code, in the corresponding universal data scaffold. In some embodiments, the server 120 can select more than offer to be included in the universal data scaffold. For example, the server 120 can include a first competing offer and a second competing offer in which the first competing offer is presented if a first criterion is satisfied and the second competing offer is presented if a second criterion is satisfied.

The offers, which are part of the universal data scaffolds 155, are typically stored at the user devices when the users install the data management platform 110 on their corresponding user devices. However, in some embodiments, the offers can also be transmitted to the users at other times. For example, when the offers are updated, such as new offers are received by the server 120, criterion of an existing offer changes, or some existing offers are not valid anymore, the server 120 updates the universal data scaffolds of which the updated offers are a part, and transmits the updates to the universal data scaffolds to the users, e.g., as part of an app update. The transmission of the app update to the user devices are triggered based on one or more conditions, e.g., based on a specified time interval such as daily basis or weekly basis; or when the user 135 opens the data management platform 110 app on the user device 105.

As described at least with reference to FIG. 8, because the digital content is stored as structured data using the universal data scaffolds, various types of intelligence can be derived by performing various analyses of the digital content, and such intelligence can be used to make relevant offers to the users. For example, if the server 120 determines that a particular user, e.g., a parent stores digital content associated with a child and various profiles of a nanny, the server 120 may send offers for background check services to the parent. When the parent opens a profile associated with the child's nanny, the data management platform 110 may present an offer to order a background check if no background check has been performed for the nanny yet.

Figure 13:
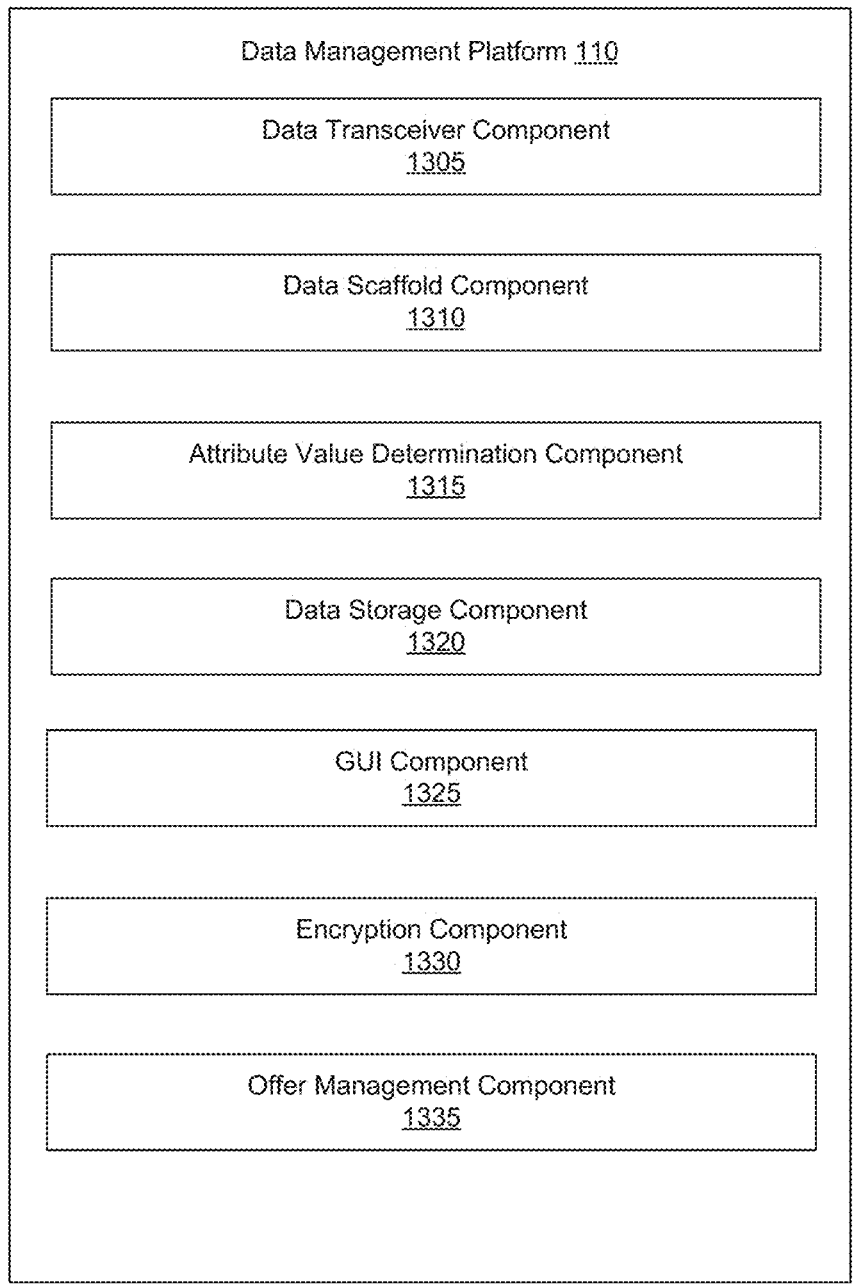
FIG. 13 is a block diagram of the data management platform of FIG. 1, consistent with various embodiments.

FIG. 13 is a block diagram of the data management platform 110 of FIG. 1, consistent with various embodiments. The data management platform 110 includes components such as a data transceiver component 1305, a data scaffold component 1310, an attribute value determination component 1315, a data storage component 1320, a GUI component 1325, an encryption component 1330, and offer management component 1335. The functionalities of the above components are described at least with reference to FIGS. 15-19 below.

Note that the data management platform 110 may include some or all of these components, as well as other components not shown in FIG. 13. For example, the data management platform 110 can include lesser number of components, e.g., functionalities of two components can be combined into one component, or can include more number of components, e.g., components that perform other functionalities. In some embodiments, the functionalities of one or more of the above components can be split into two or more components. In some embodiments, the data management platform 110 resides on the user device 105. In some embodiments, the data management platform 110 resides on the server 120. In some embodiments, the data management platform 110 can be distributed across the server 120 and the user device 105. Those skilled in the art will recognize that the components of the data management platform 110 can be distributed between the server 120 and the user device 105 in various manners.

Figure 14:
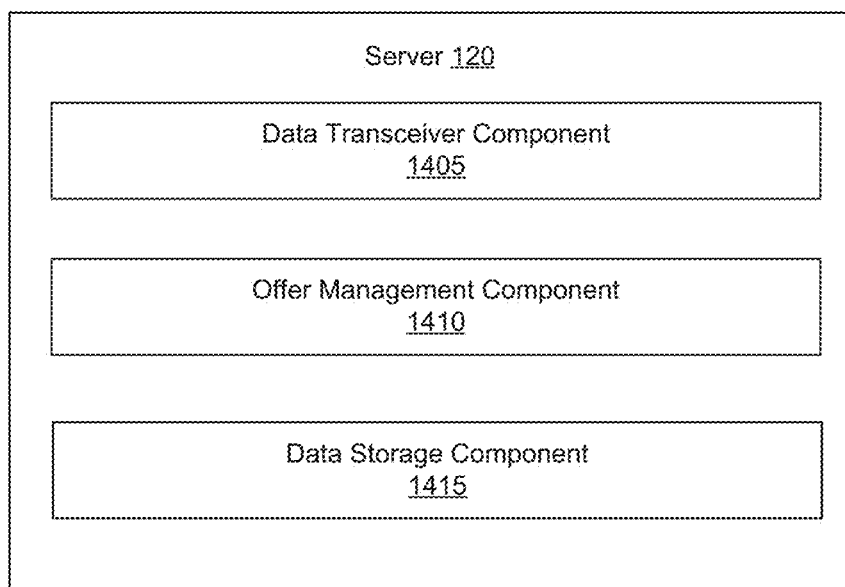
FIG. 14 is a block diagram of the server of FIG. 1, consistent with various embodiments.

FIG. 14 is a block diagram of the server 120 of FIG. 1, consistent with various embodiments. The server 120 includes components such as a data transceiver component 1405, an offer management component 1410, and a data storage component 1415. The functionalities of the above components are described at least with reference to FIGS. 15-19 below.

Note that the server 120 may include some or all of these components, as well as other components not shown in FIG. 14. For example, the server 120 can include lesser number of components, e.g., functionalities of two components can be combined into one component, or can include more number of components, e.g., components that perform other functionalities. In some embodiments, the functionalities of one or more of the above components can be split into two or more components. Further, the components can be implemented at a single server device or distributed across server devices.

Figure 15:
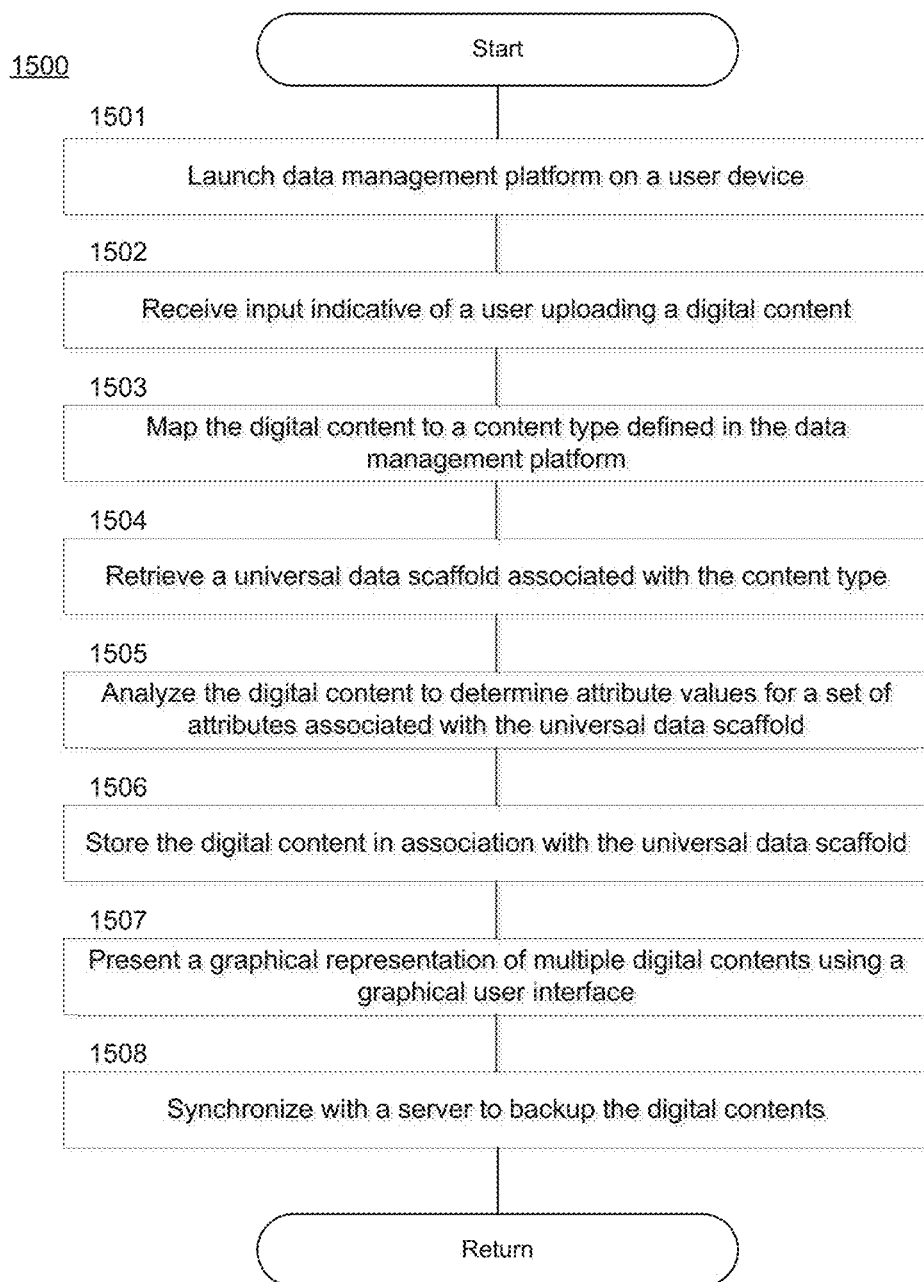
FIG. 15 is a flow diagram of a process for performing data management operations on the digital contents associated with a user, consistent with various embodiments.

FIG. 15 is a flow diagram of a process 1500 for performing data management operations on the digital contents associated with a user in a data management platform. In some embodiments, the process 1500 can be implemented in the environment 100 of FIG. 1. At block 1501, the data management platform 110 is launched on the user device 105. For example, the data management platform 110 is an app running on the user device 105. The data management platform 110 can a communication link to be established with a server 120 via network 130.

At block 1502, the data transceiver component 1305 receives a digital content, such as a picture of a car or a bill of sale of the car, uploaded by the user 135 using the GUI 115. For example, the user 135 may select the digital content from a local storage on the user device 105 or from another digital content source 140 such as a file hosting service (e.g., Dropbox®, Google Drive®, or Microsoft OneDrive®) that interfaces with the data management platform 110 (e.g., via an API).

At block 1503, the data scaffold component 1310 maps the digital content to one of the content types defined in the data management platform 110. The data scaffold component can determine the content type using any of the multiple methods described at least with reference to FIG. 5 above. For example, the data scaffold component 1310 can identify the content type based on the input fields used in the GUI 115 to enter the digital content. In another example, the data scaffold component 1310 can automatically analyze the digital content, e.g., using OCR, and determine the content type based on machine learning techniques and/or deductive inference rules. In still another example, the data scaffold component 1310 can prompt the user 135 to identify the content type from a list of content types.

At block 1504, after determining the content type, the data scaffold component 1310 retrieves a universal data scaffold corresponding to the identified content type, which defines the content type using a set of attributes and metadata (such as rules). For example, if the content type is identified as a "car," then the data scaffold component 1310 retrieves the car universal data scaffold 305 from the data management platform 110.

At block 1505, the attribute value determination component 1315 identifies the set of attributes defined in the universal data scaffold and analyzes the digital content to obtain values for the set of attributes. For example, the attribute value determination component 1315 can identify the set of attributes defined in the car universal data scaffold as make, model, year, and VIN. The attribute value determination component 1315 can analyze the digital content, e.g., using OCR, to obtain the attribute values for the above attributes, and/or prompt the user 135 to input all or some of the attribute values.

At block 1506, the data storage component 1320 stores the digital content in a structured format, e.g., along with the attribute values and the universal data scaffold of the digital content, in the user device 105. In some embodiments, the data storage component 1320 stores the digital content as a graph database in which the digital contents are represented as nodes of the graph and a relationship between the digital contents as an edge between the corresponding nodes.

At block 1507, the GUI component 1325 generates a GUI to present the digital contents to the user 135 on the user device 105. For example, the GUI component 1325 generates a graphical representation 750 that displays the digital contents. In some embodiments, the information regarding the digital content presented in the graphical representation 750 may be obtained from the graph 700. The GUI component 1325 retrieves the digital contents to be displayed in the graphical representation 750 from the node store 1005 of the user device 105, or from the server 120 in an event they are not available in the node store 1005.

The digital contents stored at the user device 105 are typically backed up to the server 120 for archiving. At block 1508, the data storage component 1320 can synchronize the user device 105 with the server 120 to back up the digital contents from the user device 105 to the server 120. The data storage component 1415 of the server 120 can store the backed up digital contents at the data storage system 125. In some embodiments, in the synchronization process, the data transceiver component 1305 transmits only those digital contents that are not yet backed up to the server and/or the digital contents that have been modified at the user device 105.

Figure 16:
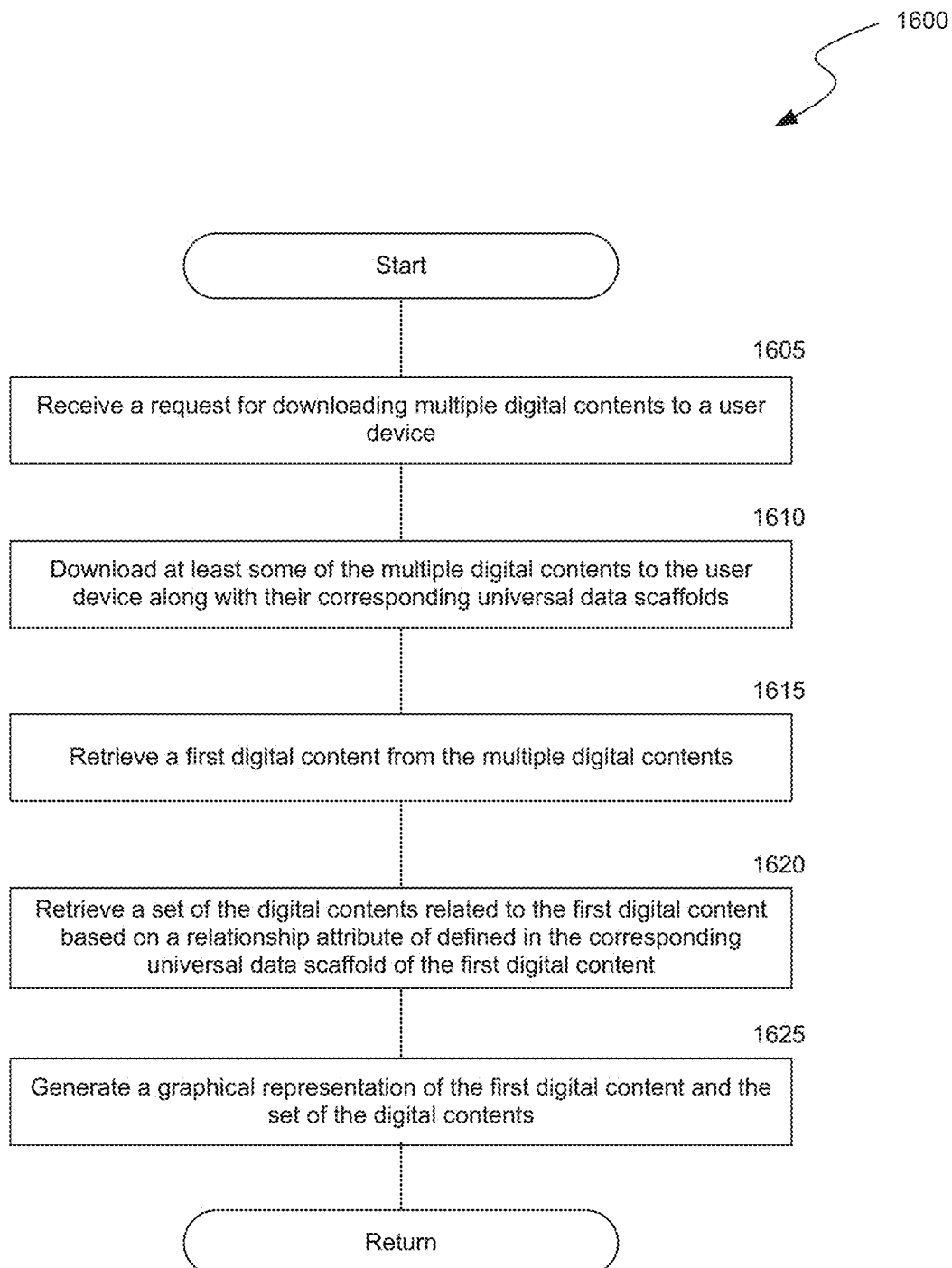
FIG. 16 is a flow diagram of a process for displaying the digital contents on the user device, consistent with various embodiments.

FIG. 16 is a flow diagram of a process 1600 for displaying the digital contents on the user device, consistent with various embodiments. In some embodiments, the process 1600 may be implemented in the environment 100 of FIG. 1. At block 1605, the data transceiver component 1305 receives a request from the user 135 for downloading digital contents associated with the user 135 from the server 120. The user 135 can issue such a request using the GUI 115.

At block 1610, the data transceiver component 1305 downloads at least some of the digital contents from the server 120 to the user device 105. In some embodiments, the number of digital contents downloaded can be determined based on a total number of digital contents stored at server 120 that are associated with the user 135 and a memory space available for storing the digital contents at the user device 105. In some embodiments, the digital contents that are downloaded can be selected by the data transceiver component 1305 based on a context associated with the user 135. The downloaded digital contents can be stored in the node store 1005. When the downloaded contents are stored in the node store 1005, some of the digital contents that are already stored in the node store 1005 may be removed from the node store 1005 to accommodate the downloaded digital contents.

At block 1615, the data storage component 1320 retrieves a first digital content from the downloaded digital contents, e.g., based on the context associated with the user 135.

At block 1620, the data storage component 1320 retrieves a set of digital contents that are related to the first digital content. For example, the data storage component 1320 can inspect the node corresponding to the first digital content to obtain the edges of the node, and then inspect each of the edges to determine the other node to which the node is connected, thereby determining the set of digital contents that is related to the first digital content.

At block 1625, the GUI component 1325 generates a graphical representation of the first digital content and the set of digital contents based on the nodes and edges determined in block 1620. For example, the graphical representation can be similar to the graphical representation 750 of FIG. 7B.

Figure 17:
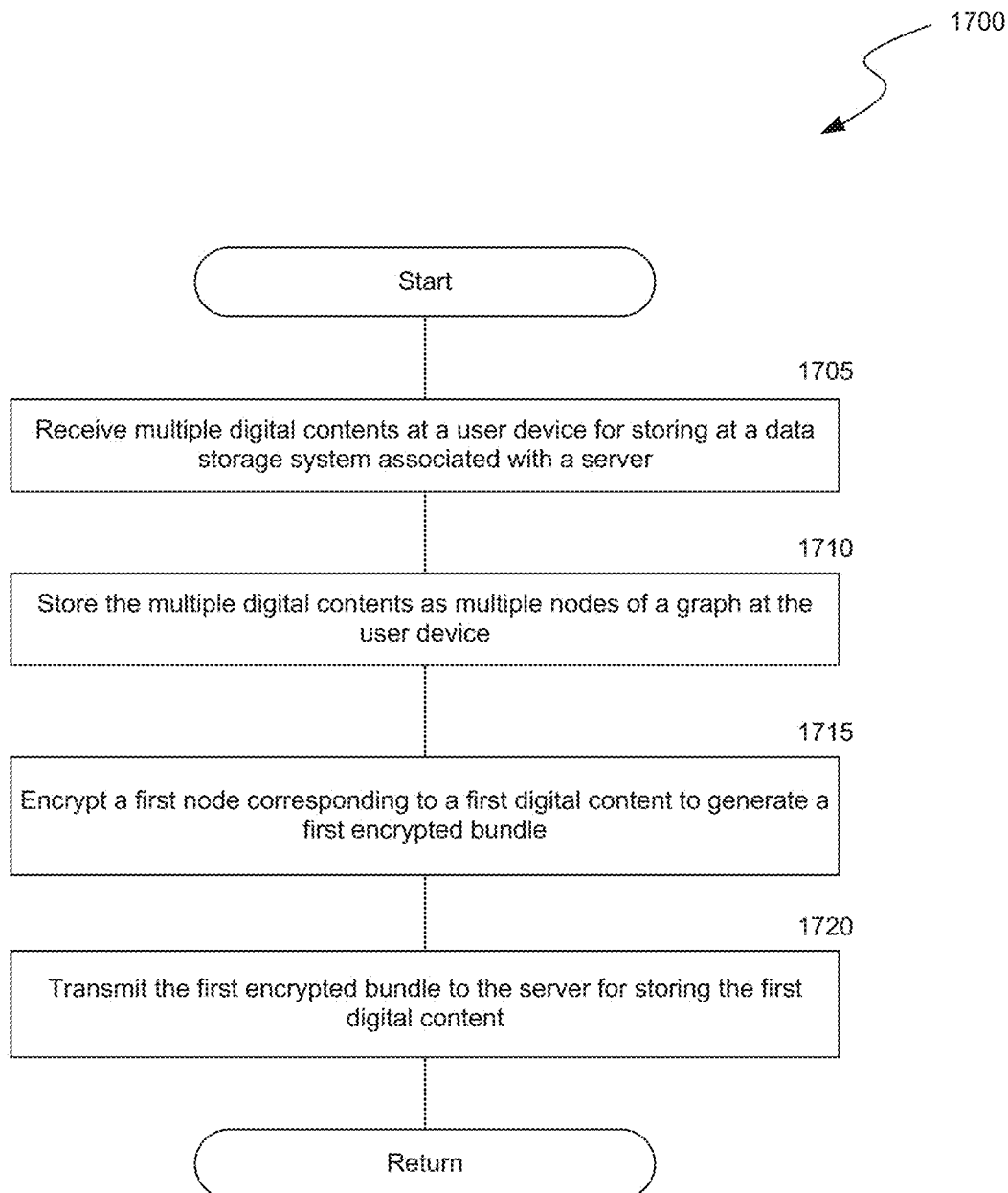
FIG. 17 is a flow diagram of a process for performing zero-knowledge encryption of the digital contents in the data management platform, consistent with various embodiments.

FIG. 17 is a flow diagram of a process 1700 for performing zero-knowledge encryption of the digital contents in the data management platform, consistent with various embodiments. In some embodiments, the process 1700 may be implemented in the environment 100 of FIG. 1. At block 1705, the data transceiver component 1305 receives multiple digital contents from the user 135. For example, the user 135 may upload the digital contents using the GUI 115.

At block 1710, the data storage component 1320 stores the digital components at the user device 105, e.g., in the node store, as a graph database in which the digital contents are represented as nodes of the graph and a relationship between the digital contents as an edge between the corresponding nodes.

At block 1715, the encryption component 1330 encrypts a first node corresponding to a first digital content to generate a first encrypted bundle of the first node. The encryption component 1330 also packages a first universal data scaffold with which the first digital content is associated in the first encrypted bundle. That is, the first encrypted bundle can include the first universal data scaffold and an encrypted version of the first digital content, including the attribute values of the attributes of the first digital content. The attributes are defined by the first universal data scaffold. The data storage component 1320 can store the first encrypted bundle in the node store 1005. The encryption component 1330 encrypts the first node using an encryption key that is typically accessible or available only at the user device 105. The encryption key can also be used for decrypting the first encrypted bundle to extract the first digital content. The encryption component 1330 can use any of multiple encryption techniques for performing the encryption.

At block 1720, the data transceiver component 1305 transmits the first encrypted bundle to the server 120 for storage at the data storage system 125. The data storage component 1415 of the server 120 receives the first encrypted bundle and stores it at the data storage system 125. In some embodiments, the data transceiver component 1305 transmits the first encrypted bundle to the server 120 when the user device is synchronized with the server 120.

Figure 18:
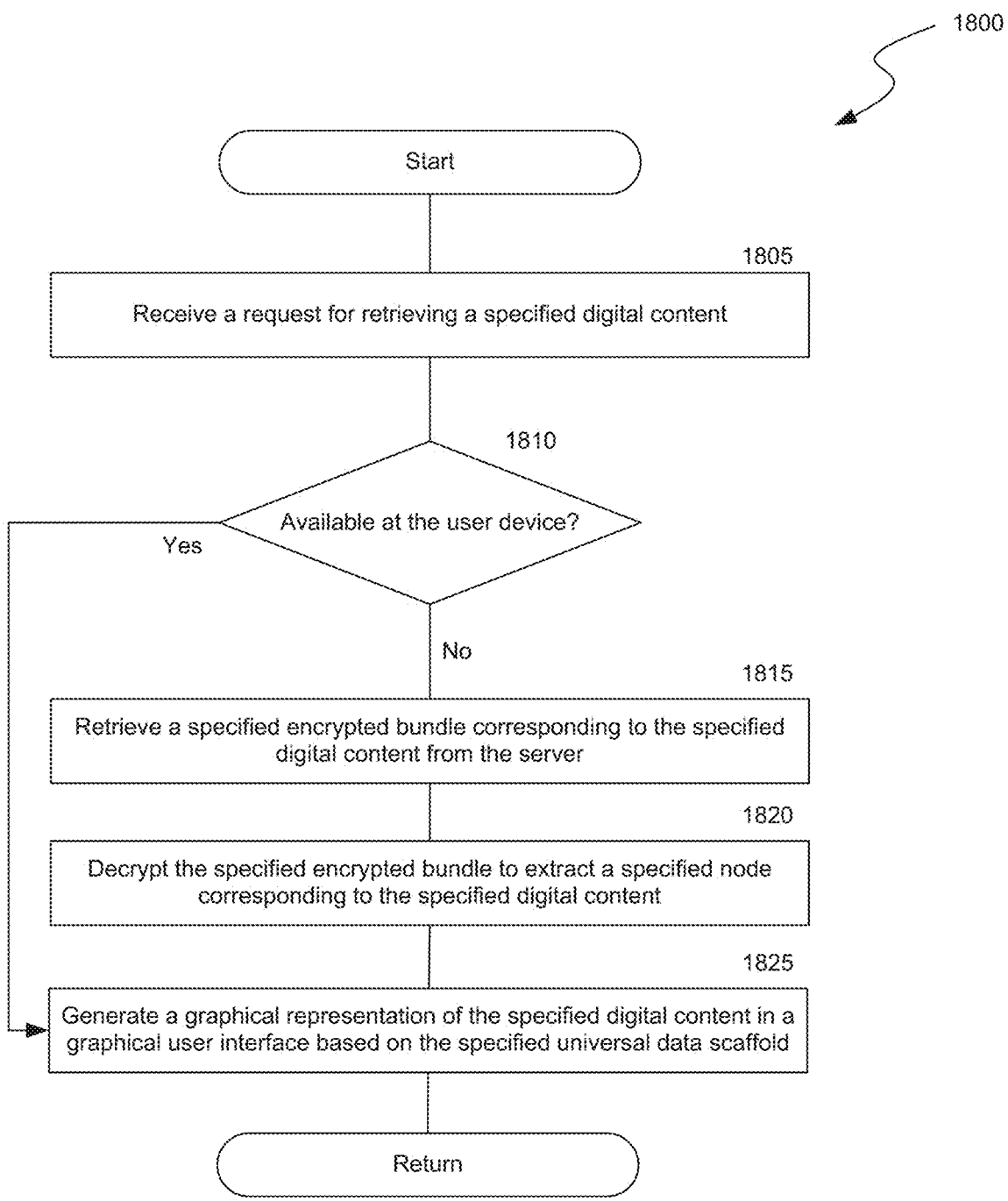
FIG. 18 is a flow diagram of a process for decrypting the digital contents in the data management platform, consistent with various embodiments.

FIG. 18 is a flow diagram of a process 1800 for decrypting the digital contents in the data management platform, consistent with various embodiments. In some embodiments, the process 1800 can be implemented in the environment 100 of FIG. 1. At block 1805, the data transceiver component 1305 receives a request for a specified digital content from the user 135.

At determination block 1810, the data storage component 1320 determines whether the specified digital content is available at the user device 105. For example, the data storage component 1320 can determine if a specified node corresponding to the specified digital content, or if a specified encrypted bundle corresponding to the specified node, is available in the node store 1005.

In an event either the specified node or the specified encrypted bundle is available at the user device 105, the process proceeds to block 1820. On the other hand, if the data storage component determines that neither the specified node nor the specified encrypted bundle is available at the user device 105, at block 1815, the data transceiver component 1305 retrieves the specified encrypted bundle from the server 120. For example, the data storage component 1415 of the server 120 can retrieve the specified encrypted bundle from the data storage system 125 and the data transceiver component 1405 at the server 120 can transmit it to the data transceiver component 1305.

At block 1820, the encryption component 1330 decrypts the specified encrypted bundle to extract (a) the specified node, which includes the specified digital content and its attribute values, and (b) a specified universal data scaffold corresponding to the specified digital content.

At block 1825, the GUI component 1325 generates a graphical representation of the specified node in the GUI 115, which corresponds to the specified digital content. The graphical representation can be similar to the graphical representation 750 of FIG. 7B. The graphical representation 750 can display the attributes and attribute values associated with the specified digital content. The attributes of the specified node are determined based on the specified universal data scaffold associated with the specified digital content.

Figure 19:
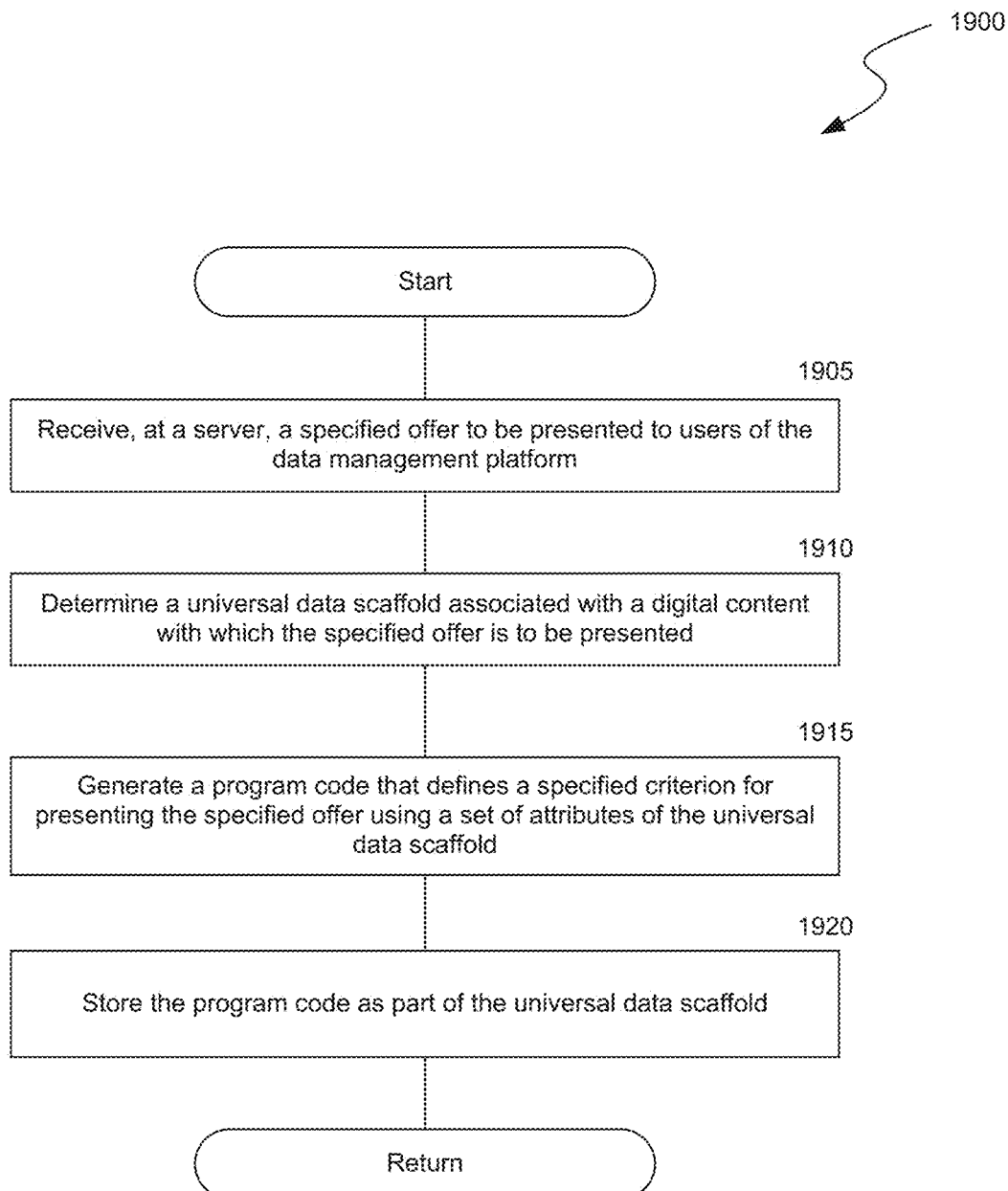
FIG. 19 is a flow diagram of a process for sending zero-knowledge offers to the users of the data management platform, consistent with various embodiments.

FIG. 19 is a flow diagram of a process 1900 for sending zero-knowledge offers to the users of the data management platform 110, consistent with various embodiments. In some embodiments, the process 1900 can be implemented in the environment 100 of FIG. 1. At block 1905, the data transceiver component 1405 at the server 120 receives a specified offer from a vendor for presenting to users of the data management platform 110. The specified offer can also include information such as a criterion for presenting the specified offer to the users. Typically, an offer is associated with or relevant to a specified content type. For example, an offer for extended warranty for a car is associated with the content type "car."

At block 1910, the offer management component 1410 determines a universal scaffold, that is, the content type, with which the specified offer is to be presented. In some embodiments, the offer management component 1410 can analyze the data associated with the specified offer to determine the content type to which the offer is relevant. The offer management component 1410 can automatically analyze the specified offer, e.g., using OCR, and determine the content type based on machine learning techniques and/or deductive inference rules, or obtain the content type from the vendor.

At block 1915, the offer management component 1410 generates a program code for presenting the specified offer to the users. The program code includes the specified offer and a server-defined criterion for presenting the specified offer to the users. The server-defined criterion is generated by redefining or reformulating the vendor-provided criterion of the specified offer using the attributes of the universal data scaffold. For example, the offer management component 1410 can reformulate a vendor-defined criterion, which states that the specified offer is to be presented to users with cars that are of year "2017" or older, by incorporating the appropriate attribute of the car universal data scaffold to generate the server-defined criterion, such as "carUDS.YEAR<2017," in which "carUDS" is the identifier of the car universal data scaffold and "YEAR" is the attribute of the car universal data scaffold.

The program code can be an executable code that can be executed at the user devices. The program code is also configured to monitor the attribute values of the digital content for which the specified offer is to be presented.

At block 1920, the offer management component 1410 stores the program code as part of the universal data scaffold. When the users install the data management platform 110 at their corresponding user devices, the universal data scaffold is stored at the user devices. Because the universal data scaffold is same for all users of the data management platform 110, all the users will have the same specified offer stored in their corresponding user devices.

Figure 20:
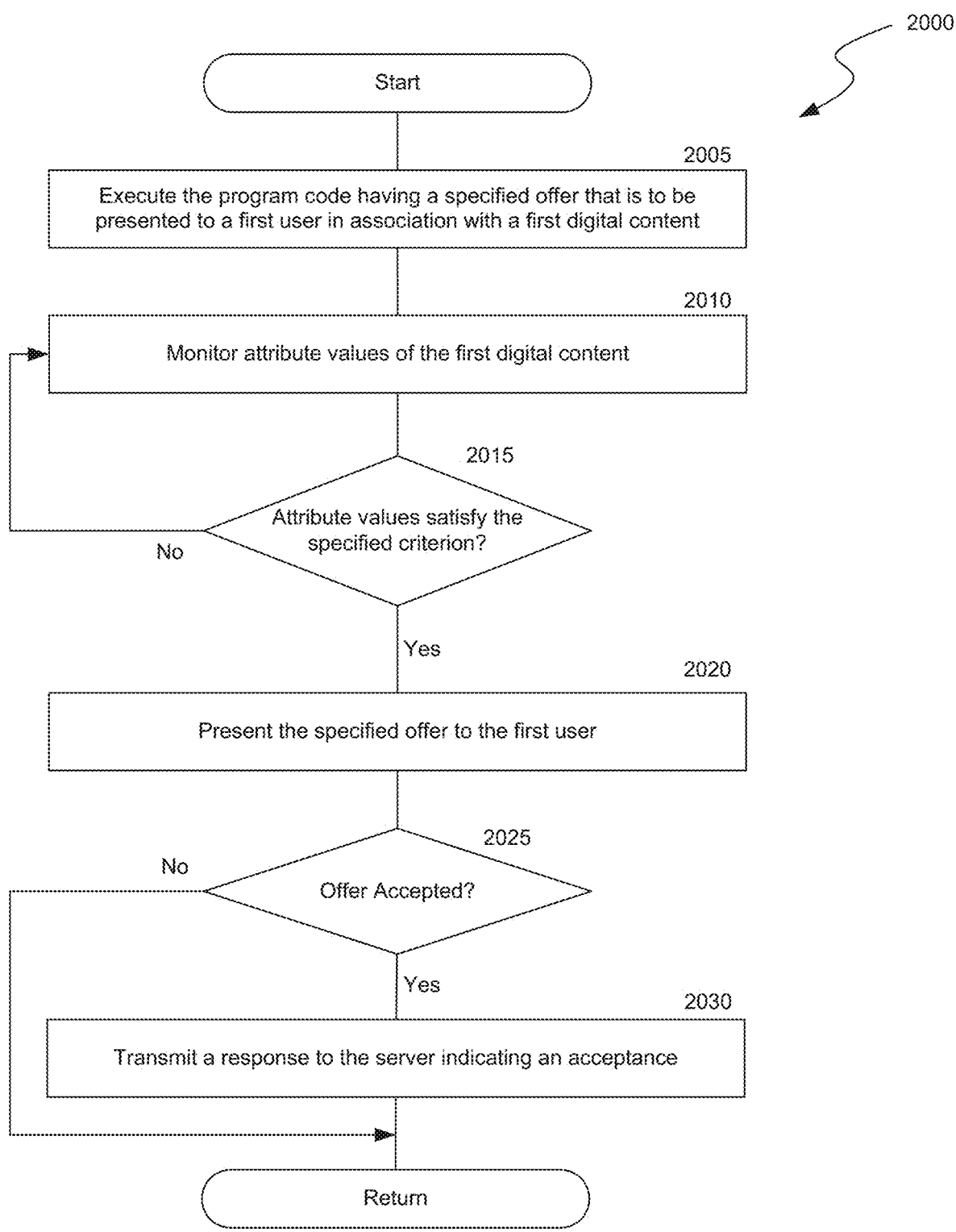
FIG. 20 is a flow diagram of a process for displaying the zero-knowledge offers to the users of the data management platform, consistent with various embodiments.

FIG. 20 is a flow diagram of a process 2000 for displaying the zero-knowledge offers to the users of the data management platform 110, consistent with various embodiments. In some embodiments, the process 2000 can be implemented in the environment 100 of FIG. 1. At block 2005, the offer management component 1335 executes a program code stored as part of a universal data scaffold at the user device 105. The program code includes a specified offer that is to be presented to the user 135 in association with a digital content at the user device 105.

At block 2010, the offer management component 1335 executes the program code to monitor attribute values of the digital content for which the specified offer is to be presented.

At determination block 2015, the offer management component 1335 determines whether the attribute values satisfy the server-defined criterion in the program code.

If the attribute values do not satisfy the server-defined criterion, the process continues to monitor the attribute values (block 2010). In an event the attribute values satisfy the server-defined criterion, at block 2020, the offer management component 1335 presents or displays the specified offer to the user 135.

At determination block 2025, the offer management component 1335 determines whether the user 135 accepted the specified offer. In an event the user accepted the specified offer, at block 2030, the data transceiver component 1305 transmits a response to the server 120 indicating an acceptance of the specified offer. In some embodiments, the response may be anonymized, e.g., by removing some or all of user identification information, prior to transmitting the response to the server 120 to preserve the privacy of the user 135.

In an event the user 135 has not accepted the specified offer, e.g., rejected or ignored, the process 2000 returns.

Figure 21:
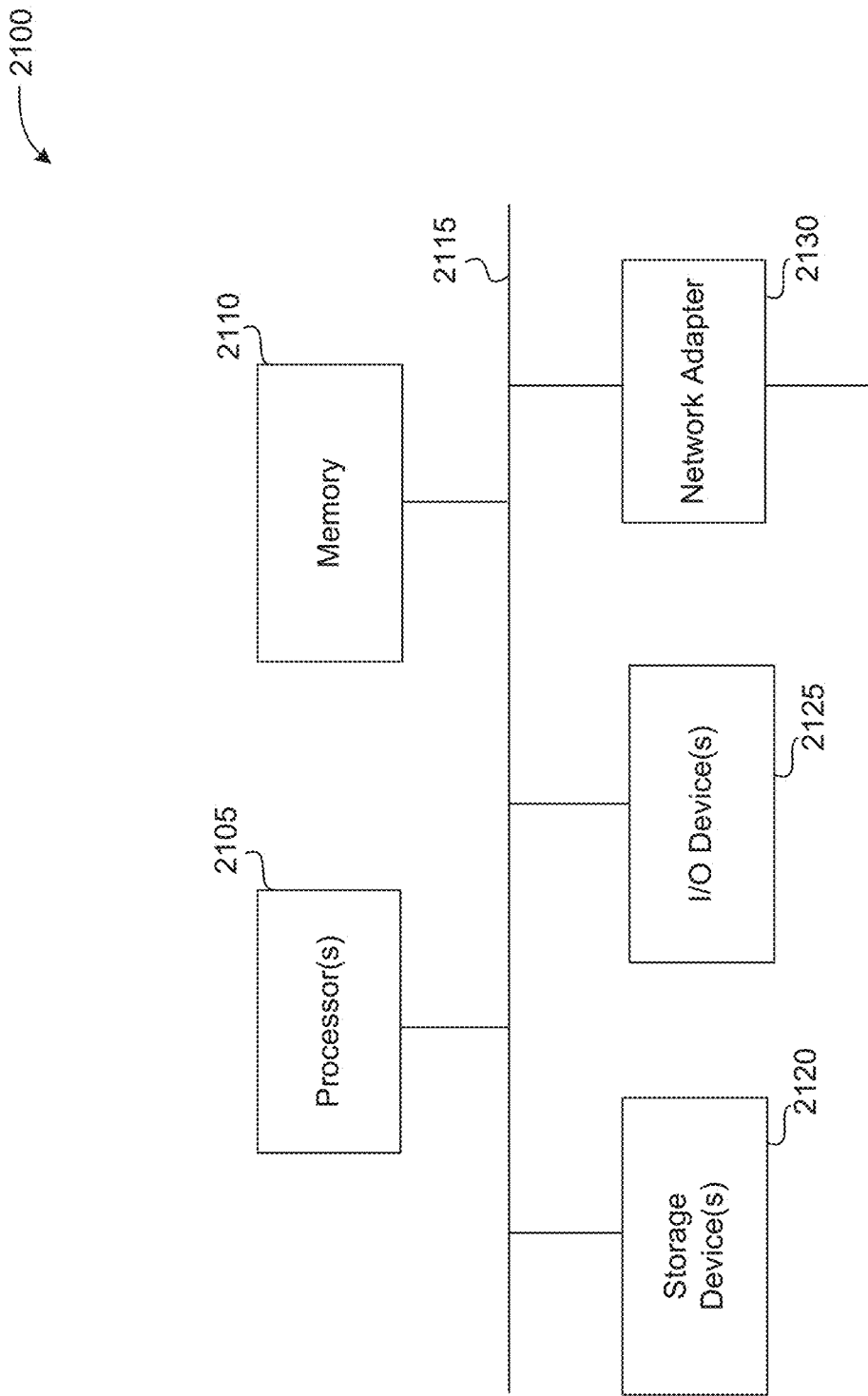
FIG. 21 is a block diagram of a computer system as may be used to implement features of some embodiments of the disclosed technology.

FIG. 21 is a block diagram of a computer system as may be used to implement features of some embodiments of the disclosed technology. The computing system 2100 may be used to implement any of the entities, components or services depicted in the foregoing figures (and any other components described in this specification). The computing system 2100 may include one or more central processing units ("processors") 2105, memory 2110, input/output devices 2125 (e.g., keyboard and pointing devices, display devices), storage devices 2120 (e.g., disk drives), and network adapters 2130 (e.g., network interfaces) that are connected to an interconnect 2115. The interconnect 2115 is illustrated as an abstraction that represents any one or more separate physical buses, point to point connections, or both connected by appropriate bridges, adapters, or controllers. The interconnect 2115, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 2110 and storage devices 2120 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 2110 can be implemented as software and/or firmware to program the processor(s) 2105 to carry out actions described above. In some embodiments, such software or firmware may be initially provided to the processing system 2100 by downloading it from a remote system through the computing system 2100 (e.g., via network adapter 2130).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A computer-implemented method comprising:
   obtaining, by a user device, data associated with a first user, wherein the data includes a first set of attributes and attribute values associated with the first set of attributes;
   encrypting, by the user device, the data associated with the first user including the first set of attributes and the attribute values associated with the first set of attributes;
   receiving, by a server, from the user device, the data associated with a first user of the user device, wherein the data associated with the first user includes a first set of attributes and a plurality of encrypted attribute values associated with the first set of attributes;
   creating, by the server, a first universal data scaffold associated with the data, wherein the first universal data scaffold defines a data structure to represent the first set of attributes and the plurality of encrypted attribute values, and wherein a decrypted attribute value associated with the first set of attributes is unavailable at the server;
   receiving, by the server, an offer to be presented to the first user;
   redefining, by the server, the offer into a criterion compliant with the first universal data scaffold including an attribute identifying a type of the criterion, and an attribute value associated with the attribute;
   based on the attribute and the attribute value associated with the criterion, generating, by the server, a program code to execute at the user device and to present the offer to the first user, wherein the program code is configured to present the offer if the attribute value associated with the first set of attributes satisfies the criterion;
   dynamically updating, by the server, the first universal data scaffold to include the program code in the first universal data scaffold by:
   determining whether a condition to send the update to the user device is satisfied; and
   upon determining that the condition to send the update to the user device is satisfied, sending, by the server, at least a portion of the first universal data scaffold including the program code to the user device to identify the attribute value associated with the first set of attributes matching the attribute associated with the criterion.

2. The computer-implemented method of claim 1 further comprising:
   executing the program code at the user device to monitor the attribute values.

3. The computer-implemented method of claim 1 further comprising:
   determining, at the user device, the attribute values of the first set of attributes of the data;
   determining, at the user device, whether the attribute values satisfy the criterion defined in the program code; and
   responsive to a determination that the attribute values satisfy the criterion, presenting, at the user device, the offer to the first user.

4. The computer-implemented method of claim 3 further comprising:
   responsive to the determination that the attribute values do not satisfy the criterion, continuing, at the user device, to monitor the attribute values.

5. The computer-implemented method of claim 3 further comprising:
   receiving, at the user device, a response from the first user indicating an acceptance of the offer; and
   transmitting, from the user device, the response to the server.

6. The computer-implemented method of claim 5, wherein transmitting the response to the server includes:
   anonymizing, at the user device, the response to remove user identification information of the first user.

7. The computer-implemented method of claim 3 further comprising:
   receiving, at the server, a response indicating an acceptance of the offer; and
   transmitting, from the server, the response to a specified server of a service provider associated with the offer.

8. The computer-implemented method of claim 7, wherein transmitting the response from the server to the specified server includes:
   anonymizing, at the server, the response to remove user identification information of the first user prior to transmitting the response to the specified server.

9. The computer-implemented method of claim 1, wherein storing the program code includes:
   anonymizing, at the server, the offer to remove identification information of a service provider of the offer.

10. The computer-implemented method of claim 1, wherein storing the program code further includes:
    storing, at the user device, the program code when the first universal data scaffold is stored on the user device.

11. The computer-implemented method of claim 1, wherein receiving the multiple offers includes:
    receiving a first offer of the multiple offers from a first service provider and a second offer of the multiple offers from a second service provider, the first offer and the second offer being for the same service,
    determining, at the server and based on a server-defined criterion, which of the first offer and the second offer satisfies the server-defined criterion, and generating the program code to present one of the first offer and the second offer that satisfies the server-defined criterion as the offer.

12. The computer-implemented method of claim 1, wherein storing the program code includes:
storing the program code at user devices of multiple users when the first universal data scaffold is stored at the user devices,
executing the program code at the user devices, and
presenting the offer to one or more of the multiple users at the user devices in an event the attribute value satisfies the criterion for the one or more of the multiple users.

13. A computer-readable storage medium storing computer-readable instructions, comprising:
instructions for obtaining, by a user device, data associated with a first user, wherein the data includes a first set of attributes and attribute values associated with the first set of attributes;
instructions for encrypting, by the user device, the data associated with the first user including the first set of attributes and the attribute values associated with the first set of attributes;
instructions for sending to a server, the encrypted data;
instructions for receiving, from the server, a first universal data scaffold associated with the data, wherein the first universal data scaffold defines a data structure to represent the first set of attributes and a plurality of encrypted attribute values;
decrypting, by the user device, the first universal data scaffold associated with the data to obtain the first set of attributes and the attribute values;
instructions for receiving, from the server and at the user device associated with the first user, a program code having an offer redefined into a criterion compliant with the first universal data scaffold including an attribute identifying a type of the criterion, and an attribute value associated with the attribute;
instructions for dynamically updating the first universal data scaffold to include the program code in the first universal data scaffold including:
instructions for determining whether a condition to obtain the update is satisfied; and
upon determining that the condition to obtain the update is satisfied, instructions for obtaining, by the user device, at least a portion of the first universal data scaffold including the program code at the user device, the program code to execute at the user device and to identify the attribute value associated with the first set of attributes matching the attribute associated with the criterion;
instructions for executing the program code to monitor the attribute values of the first set of attributes;
instructions for determining whether the attribute values satisfy the criterion; and
instructions for, responsive to a determination that the attribute values satisfy the criterion, presenting the offer to the first user.

14. The computer-readable storage medium of claim 13 further comprising:
instructions for receiving, at the user device, a response from the first user indicating an acceptance of the offer; and
instructions for transmitting, from the user device, the response to the server.

15. The computer-readable storage medium of claim 14, wherein the instructions for transmitting the response to the server include:
instructions for anonymizing, at the user device, the response to remove user identification information of the first user.

16. The computer-readable storage medium of claim 14 further comprising:
instructions for receiving, at the server, the response indicating the acceptance of the offer; and
instructions for transmitting, from the server, the response to a specified server of a service provider associated with the offer.

17. The computer-readable storage medium of claim 16, wherein the instructions for transmitting the response from the server to the specified server include:
instructions for anonymizing, at the server, the response to remove user identification information of the first user prior to transmitting the response to the specified server.

18. The computer-readable storage medium of claim 13, wherein the instructions for receiving the program code at the user device include:
instructions for receiving, at the server, the offer from a service provider to be presented to the first user based on a service provider-defined criterion,
instructions for generating, at the server, the program code by updating the service provider-defined criterion based on the first set of attributes to the criterion, and
instructions for storing, at the server, the program code with the criterion.

19. A system, comprising:
a processor;
a tenth component configured to obtain, by a user device, data associated with a first user, wherein the data includes a first set of attributes and attribute values associated with the first set of attributes;
a seventh component configured to encrypt, by the user device, the data associated with the first user including the first set of attributes and the attribute values associated with the first set of attributes;
a fourth component configured to send to a server, the encrypted data;
a first component configured to receive, from the server, a first universal data scaffold associated with the data, wherein the first universal data scaffold defines a data structure to represent the first set of attributes and a plurality of encrypted attribute values;
an eighth component configured to decrypt, by the user device, the first universal data scaffold associated with the data to obtain the first set of attributes and the attribute values;
the first component configured to receive, from—the server and at the user device associated with the first user, a program code having an-offer, redefined into a criterion compliant with the first universal data scaffold including an attribute identifying a type of the criterion, and an attribute value associated with the attribute;
a ninth component configured to dynamically update the first universal data scaffold to include the program code in the first universal data scaffold by:
determining whether a condition to obtain the update is satisfied; and
upon determining that the condition to obtain the update is satisfied, obtaining, by the user device, at least a portion of the first universal data scaffold including the program code, the program code to execute at the user device and to identify the attribute value associated with the first set of attributes, wherein the attribute value matches the attribute associated with the criterion;
a second component configured to execute the program code, wherein the program code determines whether the attribute values satisfy the criterion; and
a third component configured to present the offer to the first user in an event the attribute values satisfy the criterion.

20. The system of claim 19 further comprising:
a fifth component configured to:
receive a response from the first user indicating an acceptance of the offer, and
transmit, from the user device, the response to the server.

21. The system of claim 20, wherein the fifth component is configured to:
anonymize, at the user device, the response to remove user identification information of the first user.

22. The system of claim 20 further comprising:
a sixth component configured to:
receive, at the server, the response indicating the acceptance of the offer, and
transmit, from the server, the response to a specified server of a service provider associated with the offer.

23. A method comprising:
obtaining, at a user device, data associated with a first user, wherein the data includes a first set of attributes and attribute values associated with the first set of attributes;
encrypting, by the user device, the data associated with the first user including the first set of attributes and the attribute values associated with the first set of attributes;
sending, to a server, the encrypted data;
receiving, from the server and at the user device associated with the first user, a first universal data scaffold associated with the data, wherein the first universal data scaffold defines a data structure to represent the first set of attributes and the encrypted attribute values;
decrypting, by the user device, the first universal data scaffold associated with the data to obtain the first set of attributes and the attribute values;
receiving, from the server and at the user device associated with the first user, a program code having an offer redefined into a criterion compliant with the first universal data scaffold including an attribute identifying a type of the criterion, and an attribute value associated with the attribute;
dynamically updating the first universal data scaffold to include the program code in the first universal data scaffold by:
determining whether a condition to obtain the update is satisfied; and
upon determining that the condition to obtain the update is satisfied, obtaining, by the user device, at least a portion of the first universal data scaffold including the program code, the program code to execute at the user device and to identify the attribute value associated with the first set of attributes, wherein the attribute value matches the attribute associated with the criterion;
identifying the attribute value associated with the first set of attributes that matches the attribute value associated with the criterion; and
responsive to a determination that the attribute value satisfies the criterion, presenting the offer to the first user.

24. A computer-implemented method comprising:
obtaining, by a user device, data associated with a first user, wherein the data includes a first set of attributes and attribute values associated with the first set of attributes;
encrypting, by the user device, the data associated with the first user including the first set of attributes and the attribute values associated with the first set of attributes;
receiving, by a server, from the user device, the data associated with a first user of the user device, wherein the data associated with the first user includes a first set of attributes and a plurality of encrypted attribute values associated with the first set of attributes;
creating, by the server, a first universal data scaffold associated with the data, wherein the first universal data scaffold defines a data structure to represent the first set of attributes and the plurality of encrypted attribute values, and wherein a decrypted attribute value associated with the first set of attributes is unavailable at the server;
receiving, by the server, an offer to be presented to the first user;
generating, by the server, a program code to execute at the user device and to present the offer to the first user, the generating including:
redefining, by the server, the offer into a criterion compliant with the first universal data scaffold including an attribute identifying a type of the criterion, and an attribute value associated with the attribute;
configuring, by the server, the program code to present the offer if the attribute value associated with the first set of attributes satisfies the criterion;
dynamically updating, by the server, the first universal data scaffold to include the program code in the first universal data scaffold by:
determining whether a condition to send the update to the user device is satisfied; and
upon determining that the condition to send the update to the user device is satisfied, sending, by the server, the program code to the user device to present the offer if the attribute value associated with the first set of attributes satisfies the criterion.

25. A system, comprising:
a processor;
a first component configured to obtain, by a user device, data associated with a first user, wherein the data includes a first set of attributes and attribute values associated with the first set of attributes;
a second component configured to encrypt, by the user device, the data associated with the first user including the first set of attributes and the attribute values associated with the first set of attributes;
a third component configured to send to a server, the encrypted data;
a fourth component configured to receive, from the server, a first universal data scaffold associated with the data and a program code,
wherein the first universal data scaffold defines a data structure to represent the first set of attributes and a plurality of encrypted attribute values, and
wherein the program code includes an offer, redefined into a criterion compliant with the first universal data scaffold including an attribute identifying a type of the criterion, and an attribute value associated with the attribute;

a fifth component configured to decrypt, by the user device, the first universal data scaffold associated with the data to obtain the first set of attributes and the attribute values;

a sixth component configured to dynamically update the first universal data scaffold to include the program code in the first universal data scaffold by:
  determining whether a condition to obtain the update is satisfied; and
  upon determining that the condition to obtain the update is satisfied, obtaining, by the user device, at least a portion of the first universal data scaffold including the program code, the program code to execute at the user device and to identify the attribute value associated with the first set of attributes, wherein the attribute value matches the attribute associated with the criterion;

a seventh component configured to execute the program code, wherein the program code determines whether the attribute values satisfy the criterion; and an eighth component configured to present the offer to the first user in an event the attribute values satisfy the criterion.

\* \* \* \* \*